United States Patent
Lewis et al.

(10) Patent No.: US 11,620,676 B2
(45) Date of Patent: Apr. 4, 2023

(54) TECHNOLOGIES FOR LIVE ENTERTAINING AND ENTERTAINMENT TRENDING

(71) Applicant: Worldcast Live Inc., Brooklyn, NY (US)

(72) Inventors: Peter L. Lewis, Rutherford, NJ (US); George D. Skeete, Shelton, CT (US)

(73) Assignee: Worldcast Live Inc., New York, NY (US)

( * ) Notice: Subject to any disclaimer, the term of this patent is extended or adjusted under 35 U.S.C. 154(b) by 234 days.

(21) Appl. No.: 16/986,594

(22) Filed: Aug. 6, 2020

(65) Prior Publication Data

US 2020/0364745 A1 Nov. 19, 2020

Related U.S. Application Data

(63) Continuation of application No. 14/966,287, filed on Dec. 11, 2015, now abandoned, which is a
(Continued)

(51) Int. Cl.
*G06Q 30/02* (2012.01)
*G06Q 10/02* (2012.01)
(Continued)

(52) U.S. Cl.
CPC ......... *G06Q 30/0252* (2013.01); *G06Q 10/02* (2013.01); *G06Q 50/01* (2013.01)

(58) Field of Classification Search
CPC ..... G06Q 30/0252; G06Q 10/02; G06Q 50/01
(Continued)

(56) References Cited

U.S. PATENT DOCUMENTS

| 6,198,875 B1 | 3/2001 | Edenson et al. |
| 6,560,349 B1 | 5/2003 | Rhoads |

(Continued)

FOREIGN PATENT DOCUMENTS

| WO | WO2001/22324 | 3/2001 | |
| WO | WO-2005086016 A1 * | 9/2005 | ....... H04L 29/06027 |

OTHER PUBLICATIONS

L. Chiarandini, M. Zanoni and A. Sarti, "A system for dynamic playlist generation driven by multimodal control signals and descriptors," 2011 IEEE 13th International Workshop on Multimedia Signal Processing https://ieeexplore.ieee.org/stamp/stamp.jsp?tp=&arnumber=6093850&tag=1 (Year: 2011).*

(Continued)

*Primary Examiner* — Shannon S Campbell
*Assistant Examiner* — Lisa Ma
(74) *Attorney, Agent, or Firm* — Dentons US LLP

(57) ABSTRACT

A method is performed via a computer. The method includes receiving a reservation from a customer. The reservation is based at least in part on an agreement reached between the customer and an entertainer as negotiated between the customer and the entertainer. The reservation reserving access for the customer to a bidirectional audiovisual live streaming session according to the agreement. The session is for an entertainment performance via the entertainer according to the agreement. The method further includes granting access to the customer for the session based at least in part on the reservation. The customer and the entertainer are at different locales during the session. The method additionally includes facilitating chat between the customer and the entertainer via the session during the session. The method also includes facilitating payment according to the agreement.

12 Claims, 29 Drawing Sheets

Related U.S. Application Data continuation of application No. 13/938,465, filed on Jul. 10, 2013, now Pat. No. 9,213,949, which is a continuation-in-part of application No. 13/464,698, filed on May 4, 2012, now abandoned.

(60) Provisional application No. 61/530,477, filed on Sep. 2, 2011.

(51) Int. Cl.
*G06Q 50/00* (2012.01)
*G06Q 30/0251* (2023.01)

(58) Field of Classification Search
USPC .......................................................... 705/5
See application file for complete search history.

(56) References Cited

U.S. PATENT DOCUMENTS

| | | | |
|---|---|---|---|
| 6,564,380 B1 | 5/2003 | Murphy | |
| 6,844,893 B1 | 1/2005 | Miller et al. | |
| 7,293,060 B2* | 11/2007 | Komsi | G06Q 30/0277 709/204 |
| 7,657,910 B1 | 2/2010 | McAulay et al. | |
| 7,660,729 B2 | 2/2010 | Halavais et al. | |
| 7,711,652 B2 | 5/2010 | Schmelzer | |
| 7,739,152 B2 | 6/2010 | Waites | |
| 8,116,516 B2 | 2/2012 | Rhoads | |
| 8,160,963 B2 | 4/2012 | Risan et al. | |
| 8,484,089 B1* | 7/2013 | Lin | G06F 21/10 705/26.1 |
| 9,747,285 B1* | 8/2017 | Laufer | G06F 16/9537 |
| 2001/0032028 A1 | 10/2001 | Volpe et al. | |
| 2002/0129693 A1 | 9/2002 | Wilks | |
| 2004/0163106 A1 | 8/2004 | Schrempp et al. | |
| 2005/0024488 A1 | 2/2005 | Borg | |
| 2006/0190309 A1 | 8/2006 | Ewart et al. | |
| 2008/0195593 A1 | 8/2008 | Harju et al. | |
| 2008/0215494 A1 | 9/2008 | Corbett | |
| 2009/0019374 A1 | 1/2009 | Logan et al. | |
| 2010/0131558 A1 | 5/2010 | Logan et al. | |
| 2011/0016057 A1 | 1/2011 | Halpern | |
| 2011/0112899 A1* | 5/2011 | Strutton | G06Q 30/0251 705/14.49 |
| 2011/0137920 A1* | 6/2011 | Cohen | G06Q 30/02 707/E17.101 |
| 2011/0213699 A1 | 9/2011 | Johnson | |
| 2012/0042385 A1 | 2/2012 | Risan | |
| 2012/0158531 A1* | 6/2012 | Dion | H04N 21/632 705/26.1 |
| 2012/0324006 A1 | 12/2012 | Garofalo | |
| 2013/0005475 A1 | 1/2013 | Mahajan et al. | |
| 2013/0166725 A1 | 6/2013 | Liyanage et al. | |
| 2013/0263016 A1 | 10/2013 | Lehtiniemi et al. | |
| 2014/0067799 A1* | 3/2014 | Zolfo | G06F 16/60 707/733 |
| 2014/0335834 A1* | 11/2014 | Emerson, III | G06F 16/683 455/414.1 |
| 2016/0286244 A1 | 9/2016 | Chang et al. | |

OTHER PUBLICATIONS

BMI Website, What's New, Downloaded Jun. 12, 2013, http://bmi.com (4 pages).

FRP My Genius Instructional Video, You Tube, Published Sep. 11, 2012, http://www.youtube.com/watch?feature=player_detailpage&v=zwg4KuEzF44 (2 pages).

GigSalad, Find athlete and sports speakers near you, http://web.archive.org/web/20110519180047/https://www.gigsalad.com/Motivational-Speakers/Sports-Athletes-Speakers, web archived on May 19, 2011. (Year: 2011).

Mazzanti et al., Augmented Stage for Participatory Performances, proceedings of the International conference on new Interfaces for Musical Expression, Jun. 2014.

OSHA, Description for 7929, http://web.archive.org/web/20081012223422/https://www.osha.gov/pls/imis/sic_manual.display?id=179&tab=description; web archived Oct. 12, 2008. (Year: 2008).

SESAC Website, Downloaded Jun. 12, 2013, http://www.sesac.com (2 pages).

Shamma et al., Spinning Online: A Case Study of Internet Broadcasting by DJs, ACM, C&T 09, Jun. 25-27, 2009, University Park, Pennsylvania (10 pages).

Wikipedia page for Clowns, http://web.archive.org/web/20110131200726/https://en.wikipedia.org/wiki/Clown, web archived Jan. 31, 2011. (Year: 2011).

Wikipedia page for Comedians, http://web.archive.org/web/20110105084813/https://en.wikipedia.org/wiki/Comedian, web archived Jan. 5, 2011. (Year: 2011).

Wikipedia page for Mascots, http://web.archive.org/web/20111028134648/http://en.wikipedia.org/wiki/Mascot, web archived Oct. 28, 2011. (Year: 2011).

Wikipedia page for master of ceremonies, http://web.archive.org/web/20110301211459/https://en.wikipedia.org/wiki/Master_of_ceremonies, web archived on Mar. 1, 2011. (Year: 2011).

* cited by examiner

700

TECHNOLOGIES FOR LIVE ENTERTAINING AND ENTERTAINMENT TRENDING

CROSS-REFERENCE TO RELATED PATENT APPLICATIONS

This patent application is a continuation of U.S. patent application Ser. No. 14/966,287 filed 11 Dec. 2015; which is a continuation of U.S. patent application Ser. No. 13/938,465 filed 10 Jul. 2013; which is a continuation-in-part of U.S. patent application Ser. No. 13/464,698 filed 4 May 2012; which claims a benefit of priority to U.S. Patent Application 61/530,477 filed 2 Sep. 2011; each of which is herein fully incorporated by reference for all purposes.

TECHNICAL FIELD

Generally, the present disclosure relates to entertainment. More particularly, the present disclosure relates to technologies for live entertaining and entertainment trending.

BACKGROUND

In the present disclosure, where a document, an act or an item of knowledge is referred to and/or discussed, then this reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure is concerned.

An event planner typically hires an entertainer to perform at a specific event occurring at a specific venue. One example of such entertainer is a disc jockey (DJ). Currently, a number of factors limit the event planner and the entertainer. For example, when the event planner is cost-conscious, then the event planner is limited to selecting the entertainer who is located within a reasonable traveling distance to the venue. Likewise, the entertainer is limited to marketing and providing entertainment services to non-cost-conscious event planners and/or geographic regions located within a reasonable traveling distance from the entertainer. Similarly, since the entertainer is usually personally present at the event, sharing the entertainer between multiple events is impractical. Also, in context of the DJ, music available to the DJ is often limited by a number of compact discs (CDs), equipment, records and/or other media the DJ can physically bring.

Further, prior to hiring the entertainer, the event planner would often like to audition the entertainer. For such auditioning, the event planner typically has to attend an event where the entertainer is performing, which may be taking place at an inconvenient time and/or place. Additionally, if, on the day of the event, the entertainer is unavailable due to an unforeseeable circumstance, such as an illness, traffic, poor weather and/or an equipment malfunction, then the event planner is limited to few, if any, last minute entertainer alternatives. Moreover, interaction between event attendees and the entertainer, such as song requests and/or event attendee feedback, is typically limited if a number of people attending the event is large and/or the event is spread over a large area of the venue, such as a large dance floor.

Moreover, many indie music artists, such as composers, performers, musicians, and/or singers, have insubstantial financial resources. Resultantly, the artists are limited in marketing their content. Such restraint often leads to reduced content promotion and/or reduced name recognition.

While certain aspects of conventional technologies have been discussed to facilitate the present disclosure, no technical aspects are disclaimed. The claims may encompass one or more of the conventional technical aspects discussed herein.

BRIEF SUMMARY

According to an example embodiment of the present disclosure a method is provided. The method is performed via a computer. The method includes receiving a reservation from a customer. The reservation is based at least in part on an agreement reached between the customer and an entertainer as negotiated between the customer and the entertainer. The reservation reserving access for the customer to a bidirectional audiovisual live streaming session according to the agreement. The session is for an entertainment performance via the entertainer according to the agreement. The method further includes granting access to the customer for the session based at least in part on the reservation. The customer and the entertainer are at different locales during the session. The method additionally includes facilitating chat between the customer and the entertainer via the session during the session. The method also includes facilitating payment according to the agreement.

According to another example embodiment of the present disclosure a method is provided. The method performed via a computer. The method includes receiving time and date information for an entertainment event. The receiving is from an entertainment content publisher. The method further includes scheduling the event for an online live audiovisual broadcast via the publisher based at least in part on the time and date information. The method additionally includes providing an automatically generated session code to the publisher based at least in part on the scheduling. The method also includes facilitating distribution of the code from the publisher to a plurality of entertainment content subscribers. The method even further includes facilitating the broadcast. The method yet even further includes conditioning access to the broadcast based at least in part on receipt of the code from the subscribers and payment from the subscribers. The publisher and the subscribers are at different locales from each other during the broadcast.

According to yet another example embodiment of the present disclosure a method is provided. The method performed via a computer. The method includes availing audio content to a plurality of entertainers for use during a plurality of entertainment performances. The method further includes receiving access data for the content based at least in part on the availing. The method even further includes receiving feedback data from the entertainers based at least in part on use of the content during the performances. The method additionally includes applying the access data and the feedback data to demographic data. The method also includes determining at least one relationship based at least in part on the applying. The method yet even further includes output information indicative of the at least one relationship.

The present disclosure may be embodied in the form illustrated in the accompanying drawings. Attention is called to the fact, however, that the drawings are illustrative.

Variations are contemplated as being part of the present disclosure, limited only by the scope of the claims.

BRIEF DESCRIPTION OF DRAWINGS

The accompanying drawings illustrate example embodiments of the present disclosure. Such drawings are not to be construed as necessarily limiting the present disclosure. Like numbers and/or similar numbering scheme can refer to like and/or similar elements throughout.

DETAILED DESCRIPTION OF PREFERRED EMBODIMENTS

Figure 1:
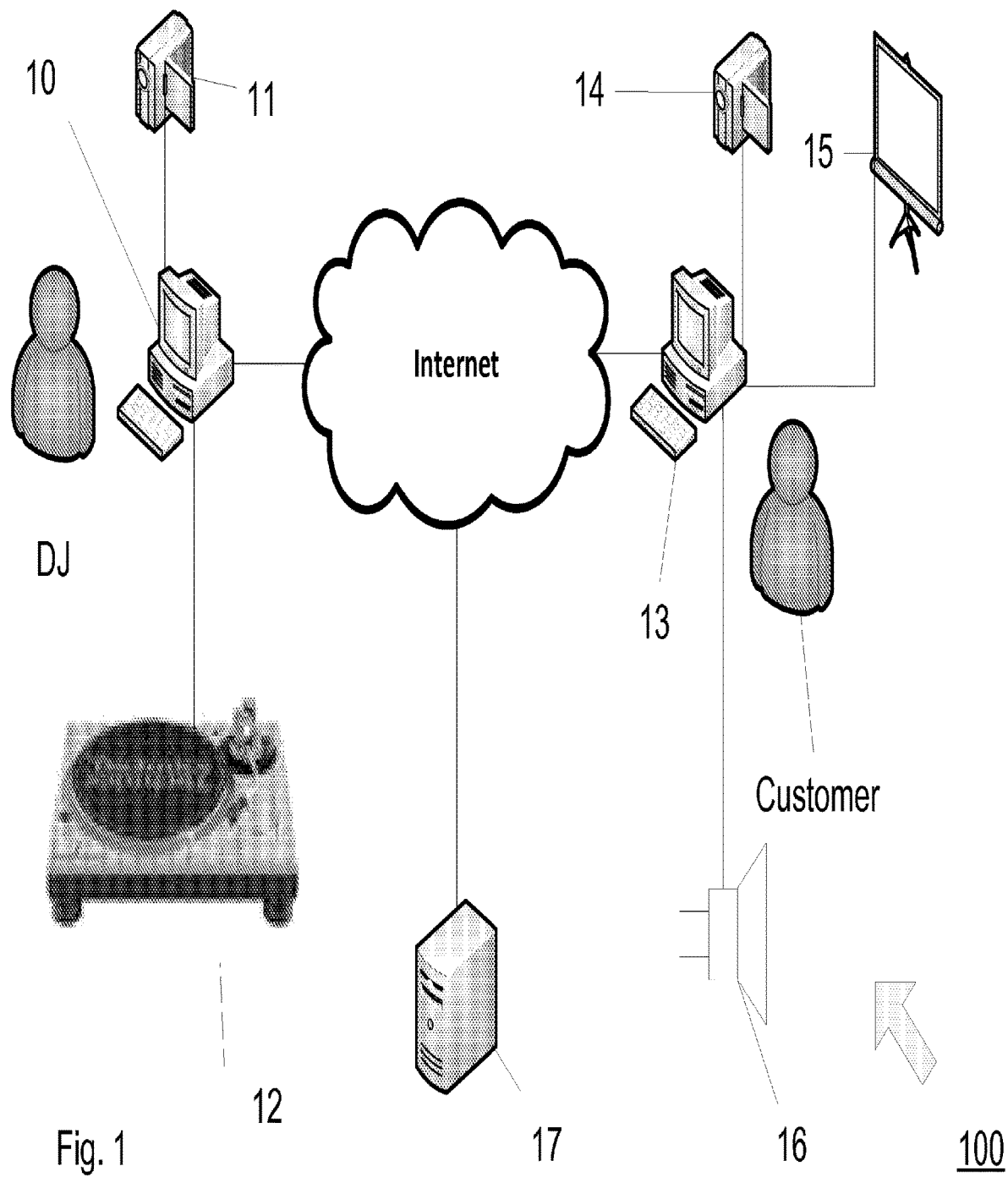
FIG. 1 is a diagram showing an example embodiment of a one-to-one network environment according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of the example embodiments may be combined in a similar manner.

Terms as used herein can imply direct or indirect, full or partial, action or inaction. For example, when an element is referred to as being "on," "connected" or "coupled" to another element, then the element can be directly connected or coupled to the other element and/or intervening elements may be present. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

Any and/or all blocks of processes described herein can be performed, whether via hardware logic and/or software logic, by and/or on behalf of one and/or more entities/parties, irrespective of their relationship to each other. Also, any and/or all blocks of processes described herein can be a part of a larger process, irrespective of any relation to entertainment. For example, various function can be taking place before, during and/or after performance of any one or more blocks of processes described herein, whether on a same or a different machine. Alternatively, any and/or all blocks of processes described herein can be performed on their own as well, whether on a same or a different machine. Further, any and/or all blocks of processes described herein can be performed relatively contemporaneously and/or non-contemporaneously. Moreover, any and/or all blocks as described herein can be implemented via a software application running on a computer, such as described herein, a mobile app running on a mobile device, such as described herein, or via a website running on a server, such as described herein.

The present disclosure can be used in context of any entertainer, such as a DJ, a musician, an orchestra, a band, a choir, a singer, a comedian, a guest speaker, an actor, an athlete, a magician, a clown, a mascot, a master of ceremonies (MC) and/or or any other type of entertainer and/or combination thereof. Note that the entertainer can include at least one party and/or at least one entity acting on behalf of the entertainer.

FIG. 1 is a diagram showing an example embodiment of a one-to-one network environment according to the present disclosure. A network environment 100 includes a server 17 coupled via a network to a first computer 10 and a second computer 13. The network can include Internet. Examples of computer 10 include a laptop, a smartphone and/or a tablet personal computer. Examples of computer 13 include a laptop, a smartphone and/or a tablet personal computer. Computer 10 is stationed at a first locale, such as a studio, an auditorium, a vehicle, a corporate event and/or a house party. Computer 20 is stationed at a second locale, such as a studio, an auditorium, vehicle, a corporate event and/or a house party. The first locale is distinct from the second locale.

Computer 10 includes a processor, a memory coupled to the processor, a network communication device coupled to the processor, an input means coupled to the processor, and an output means coupled to the processor. Examples of the input means include a physical or virtual keyboard and/or a physical or virtual mouse. Examples of the output means include a display, a printer and/or a speaker. Examples of the network communication device include a network card and/or an antenna. The network communication device can connect to and/or communicate over a network, such as Internet. Computer 10 can include a computer system.

Computer 10 is coupled to a webcam 11, which provides a view of a DJ and/or the first locale, such as a DJ studio. Webcam 11 can include a microphone. Computer 10 is coupled to a DJ device 12, such as a musical instrument, a microphone, a turntable and/or a mixer. Computer 10 can record content received from webcam 11, DJ device 12, server 17 and/or computer 13. A DJ can operate computer 10. In another example embodiment, a plurality of DJ devices 12 is coupled to computer 10. DJ devices 12 can be identical to or different from each other. DJ devices 12 can be operated by different DJs or a single DJ. DJ devices 12 can be providing different inputs to computer 10. In yet another example embodiment, a plurality of webcams 11 is coupled to computer 10. Webcams 11 can be set at a plurality of different angles providing a plurality of different views of the DJ and/or the first locale. Webcams 11 can be automatically and/or manually activated and/or controlled.

Computer 13 includes a processor, a memory coupled to the processor, a network communication device coupled to the processor, an input means coupled to the processor, and an output means coupled to the processor. Examples of the input means include a physical or virtual keyboard and/or a physical or virtual mouse. Examples of the output means include a display, a printer and/or a speaker. Examples of the network communication device include a network card and/or an antenna. The network communication device can connect to and/or communicate over a network, such as Internet. Computer 13 can include a computer system.

Computer 13 is coupled to a webcam 14, which provides a view of a customer, such as an event planner, an event attendee, another DJ, a musician, an orchestra, a band, a choir, a singer, a comedian, a guest speaker, an actor, an athlete, a magician, a clown, and/or any other type of entertainer, and/or the second locale, such as an event venue. Note that computer 13 can also be operated via a non-customer, such as for free. Webcam 14 can include a microphone. Computer 13 is coupled to a screen 15, such as a projector or a display. Computer 13 is coupled to a speaker 16. Computer 13 can record content received from webcam 14, server 17 and/or computer 10. A customer can operate computer 13. In another example embodiment, a plurality of webcams 14 is coupled to computer 13. Webcams 14 can be set at a plurality of different angles providing a plurality of different views of the customer and/or the second locale. Webcams 14 can be automatically and/or manually activated and/or controlled. In an example embodiment, second computer 13 is coupled to a plurality of screens 15 or speakers 16, thus providing an enhanced visual and audio experience, respectively.

Server 17 includes a processor, a memory coupled to the processor and a network communication device, which connects server 17 to a network or communicates with a network. Examples of the network communication device include a network card and/or an antenna. Server 17 can run a database, host a website, perform payment processing and/or perform entertainment event scheduling. Server 17 can include an entertainer service reservation system configured for reserving an entertainer service, such as a DJ, by a customer. Server 17 can be stationed at the first locale or at the second locale or at a third locale different from the first locale and the second locale. Server 17 is configured to facilitate communication and audio/video real-time streaming of content from computer 10, at least as input by webcam 11, DJ device 12 and the input means of computer 10, to computer 13. Server 17 is also configured to facilitate communication and audio/video real-time streaming of content from computer 13, at least as input by webcam 14 and the input means of computer 13, to computer 10. To ensure uninterrupted streaming, server 17 can be configured for intelligent streaming, thus adjusting a stream speed or a stream quality to computer 10 and computer 13 depending on connection speeds with computer 10 and computer 13. Server 17 can record in real-time any passing through visual or audio content. Server 17 can include a computer system. Server 17 can include a software server.

In an example mode of operation, at the first locale, using computer 10, a DJ accesses server 17 and starts a DJ session. Using DJ device 12, the DJ producing DJ content, which can be audio and/or visual. DJ device 12, in real-time, inputs the DJ content into computer 10. Webcam 11 captures and inputs, in real-time, into computer 10 images/sounds of the DJ in action and/or of the first locale. Computer 10 streams the DJ content and the images/sounds of the DJ in action to server 17. A customer accesses server 17 via computer 13. The customer starts receiving from server 17 the stream transmitted from computer 10. The stream can be employing mutually interactive bidirectional audiovisual voice over IP protocol. The received stream includes the DJ content and the images/sounds of the DJ in action. The customer hears the DJ content via speaker 16. The customer sees the DJ content on screen 15. The customer hears sounds of the DJ in action via speaker 16. The customer sees images of the DJ in action on screen 15. The customer can control access to the received stream. Thus, for example, the event attendees can visually browse the second locale before attending. Similarly, at the second locale, webcam 14 captures and inputs, in real-time, into computer 10 images/sounds of the customer and/or of the second locale. Computer 13 streams the images/sounds of the customer and/or of the second locale to server 17. Computer 10 receives from server 17 the stream transmitted from computer 13. The received stream includes the images/sounds of the customer and/or of the second locale. The DJ sees images of the customer and/or the second locale on a display of computer 10. The DJ hears sounds of the customer and/or the second locale on earphones and/or speakers of computer 10. If necessary, the DJ can adjust the DJ content based on received auditory and/or visual feedback, as captured from webcam 14. The DJ and the customer can interact, in real-time, via server 17. The interaction can be visual, auditory and/or via chat. For example, via chat, the customer via computer 13 can communicate a song request to the DJ and/or the DJ, via response chat and/or audio communication, can seek, in real-time, the customer feedback of the currently playing DJ content. The communication can also take place live via social media, thus enhancing the DJ experience.

In another example embodiment, the DJ and/or the customer can leverage profit sharing by opt-in programs where advertisements are shown during the DJ session. The advertisements can be shown on any part of screen 15, such as at bottom left or right corner portions.

In yet another example embodiment, although one DJ and one customer are connected to server 17, multiple DJs and/or multiple customers can be simultaneously connected to server 17. For example, multiple DJs can provide DJ services and interact individually and/or simultaneously with multiple customers, multiple DJs can provide DJ services and interact individually and/or simultaneously with a single customer and a single DJ can provide DJ services and interact individually or simultaneously with multiple customers, who may split a cost associated with the DJ. Such communications can be public, private and/or selectively viewable.

In yet even another example embodiment, any portion of content passing through server 17 can be recorded and upon conclusion of the DJ services, automatically made available to the customer as a souvenir and/or the DJ as marketing material.

In yet additional example embodiment, server 17 can be coupled to a points incentive system, which allows members, such as customers, to earn points based on sessions performed via server 17. The points system can be tied to retail stores and vendors where members can redeem the earned points. Retail stores, which are coupled to server 17, can allow shoppers to earn points with trivia from mobile apps. The points earned can then be converted into coupons or vouchers redeemable in the retail store. The points functionality can be implemented in any way.

Figure 2:
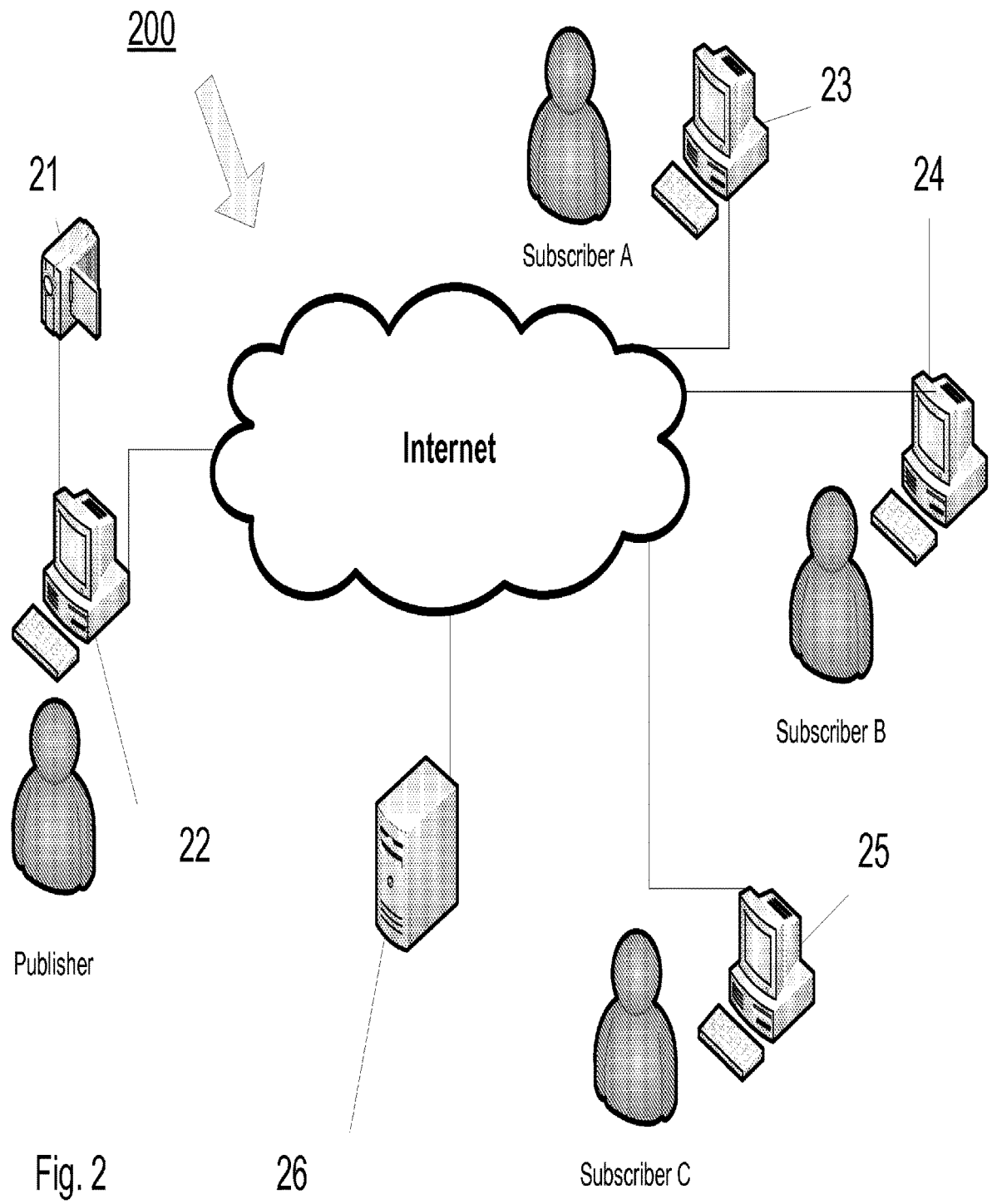
FIG. 2 is a diagram showing an example embodiment of a one-to-many network environment according to the present disclosure.

FIG. 2 is a diagram showing an example embodiment of a one-to-many network environment according to the present disclosure. A network 200 includes a server 26 coupled via a network to a first computer 22, a second computer 23, a third computer 24 and a fourth computer 25. The network can include Internet. Computer 22, 23, 24 and/or server 26 can include a computer system.

Computer 22 is coupled to a webcam 21, which provides a view of an entertainer. Webcam 21 can include a microphone for providing a sound of the entertainer. A content publisher at a first locale, which can include the entertainer, operates computer 22. The content publisher can include a media company or a venue, such as a club. Computer 22 includes a processor, a memory coupled to the processor, a network communication device coupled to the processor, an input means coupled to the processor, and an output means coupled to the processor. Examples of the input means include a physical or virtual keyboard and/or a physical or virtual mouse. Examples of the output means include a display, a printer and/or a speaker. Examples of the network communication device include a network card and/or an antenna. The network communication device can connect to and/or communicate over a network, such as Internet.

Computer 23, computer 24 and computer 25 are operated by a subscriber A at a second locale, a subscriber B at a third locale and a subscriber C at a fourth locale, respectively. Each of computers 23, 24 and 25 includes a processor, a memory coupled to the processor, a network communication device coupled to the processor, an input means coupled to the processor, and an output means coupled to the processor. Examples of the input means include a physical or virtual keyboard and/or a physical or virtual mouse. Examples of the output means include a display, a printer and/or a speaker. Examples of the network communication device include a network card and/or an antenna. The network communication device can connect to and/or communicate over a network, such as Internet.

In an example mode of operation, a publisher initiates an entertainment session for a fixed fee. Via server 26, the publisher streams content from an entertainer, as captured from webcam 21, from computer 22 to computer 23, computer 24 and computer 25 for viewing by subscribers A, B and C, which may split a cost of the fixed fee in three ways, which can be equal. Note that the subscribers A, B and C can be mixed and matched among locales in any manner, such as subscribers A and B being in one locale, whether knowing or unknowing of each other's presence, and subscriber C being in another locale.

Figure 3:
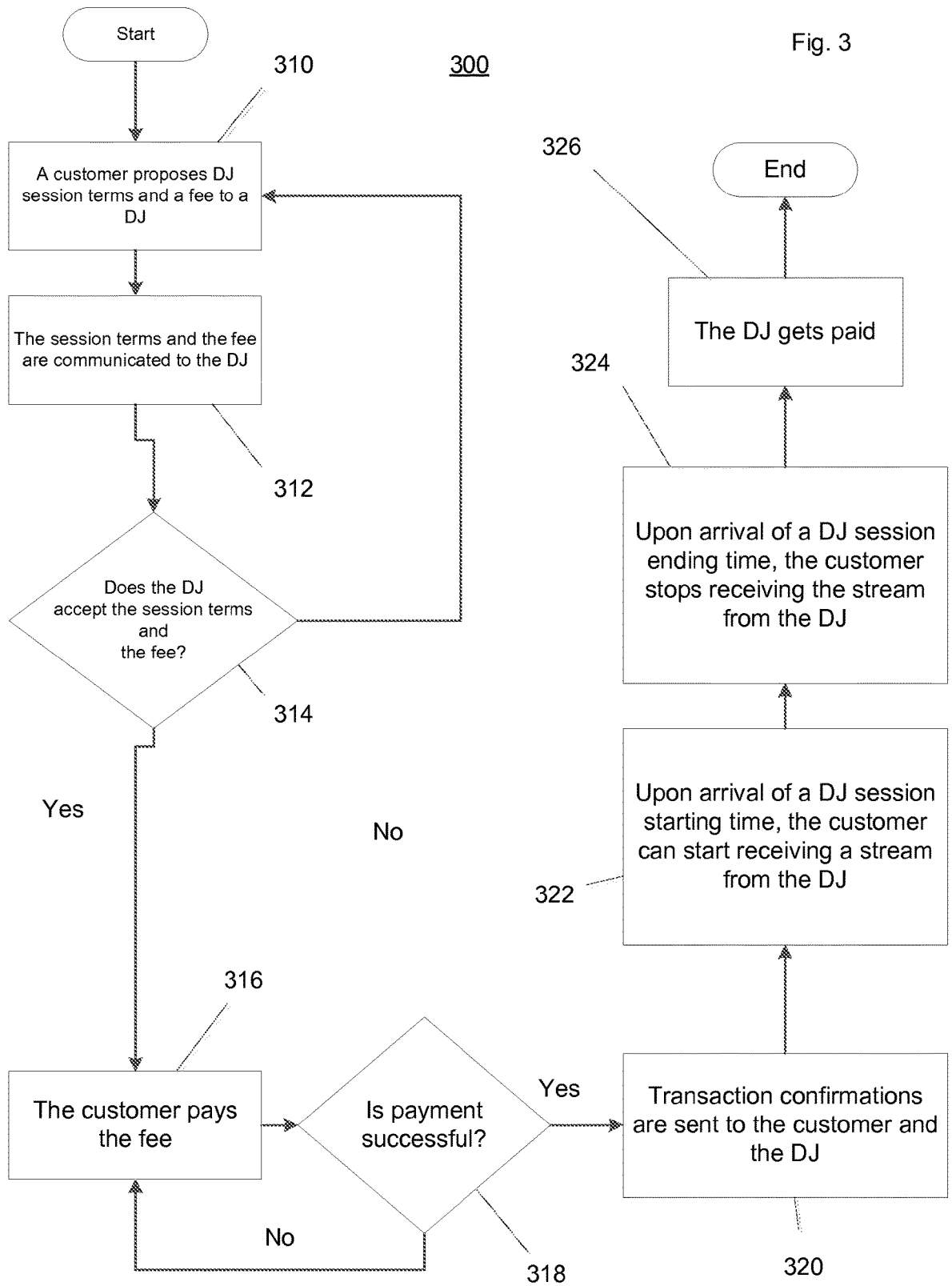
FIG. 3 is a flowchart showing an example embodiment of an entertainer service reservation process according to the present disclosure.

FIG. 3 is a flowchart showing an example embodiment of an entertainer service reservation process according to the present disclosure. A process 300 includes blocks 310-326. For example, in context of FIG. 1, a customer uses process 300 to book an entertainer, such as a DJ. For example, in context of FIG. 2, subscribers A, B and C use process 300 to book an entertainment service session with a publisher streaming content from an entertainer. Any portion of process 300 can be implemented on a website hosted on a server into which a customer and an entertainer can both be simultaneously signed into. Alternatively, any portion of process 300 can be implemented via a server coupled to a smartphone application running on a customer smartphone and an entertainer smartphone. Process 300 can be implemented with any type of entertainer, such as a DJ, a musician, an orchestra, a band, a choir, a singer, a comedian, a guest speaker, an actor, an athlete, a magician, a clown, or any other type of entertainer. However, for simplicity and clarity, process 300 is described in context of a DJ.

In block 310, a customer proposes a plurality of DJ session terms and a fee to a DJ. The DJ session terms include a DJ session date, a DJ session starting time and a DJ session ending time. The DJ session date, the DJ session starting time and the DJ session ending time can be automatically configured to end on a preset rule, such as based at least in part on an Internet Protocol (IP) address, daylight savings time and/or a time zone. The fee can be paid via any payment processing method, such as a credit card and/or a debit card. The fee can be an hourly fee, a flat session fee and/or another fee arrangement, such as per event attendee or per viewer. The customer can include a plurality of entities and/or people. The entertainer can include a plurality of entities and/or people. Note that the customer can include at least one party and/or at least one entity acting on behalf of the customer. Also note that the customer does not have to be in actual audience during the DJ session.

For example, a customer signs into a website and, via a customer profile page, searches for and identifies a DJ via a DJ created searchable DJ profile page. The DJ profile page can be customized to be found anytime or only by availability, such as for a booking on a particular date, such as holiday weekends or July 4th, or a date range, such as weekends only from May 3Pt to July 4th. The search can be performed via keywords, social media features, DJ gender, DJ ratings, DJ personal information and/or DJ genre type. The search result can return a list of links for a single or multiple DJs. Each entry on the list can include a link to one DJ profile page matching the search criteria. The DJ profile page can include chat, social media features, work portfolio, preview tracks and/or videos of the DJ. Upon identification of a desired DJ, the customer selects the DJ via the DJ profile page and is then presented with a booking calendar for the desired DJ. The calendar can be any type of calendar and even include a listing of available dates and/or times. Alternatively, the customer can select an entry in the booking calendar, such as a date and a time, and then search for a desired DJ based on the selected booking calendar entry among DJs who made themselves available on a date corresponding to the selected booking calendar entry. Upon selection of the desired DJ, the customer then proposes DJ session terms and the fee. Also alternatively, the customer can propose DJ session terms and a fee and then be provided with a list of all DJs who match the DJ session terms and the fee and then narrow down the provided list based on other criteria, such as gender, ratings, personal information and DJ genre type.

In block 312, the session terms and the fee are communicated to the DJ. The communication can be in any known electronic communication way, such via an email, a text message and/or an app, whether specific to the website or non-specific to the website. Also alternatively, the session terms and the fee can be communicated in a non-electronic manner, such as via snail mail, a courier and/or others.

In block 314, a determination is made as to whether the DJ accepts the session terms and the fee. If yes, process 300 continues to block 316. If not, process 300 continues to block 310 where the customer can select another DJ or bargain, such as via chat, email, text messaging, with the selected DJ until a mutually agreed session terms and the fee. For example, the DJ upon receipt of the message including the DJ session date, the DJ session starting time, the DJ session ending time, the payment processing method and the fee makes a decision whether the proposed sessions terms and the fee are acceptable to the DJ. The DJ inputs DJ's decision, such as accept or decline, into the website. Upon accepting, the booking time slot is stored in the website and is associated with the DJ profile page, such as via a calendar of the profile page, which can become immediately available to other customers. Alternatively, the DJ, on the website, can create a rule based filtering algorithm which automatically accepts or rejects or forwards to the DJ the session terms and the fee based on certain dates, such as all federal holidays, DJ entered dates or dates which the DJ already agreed to perform on, locations, times, events, keywords, modes of payment, fee arrangements and fees.

In block 316, the customer pays the fee. The fee is paid via the form of payment and the amount that the DJ previously agreed upon. The fee is paid to an operator of the website. Alternatively, the fee is paid to the DJ and a certain percentage is deducted from the customer or the DJ or both for the operator of the website. Note that fee payment can include direct money transfer between the customer and the DJ, such as via a bank, or indirect payment between the customer and the DJ via various payment processing methods, such as credit cards. Note that currency used for the fee can be any type of currency or medium of exchange, whether physical or virtual, whether backed via a governmental entity, such as a dollar, a shekel or a ruble, whether backed via a private entity, such as a reward system, whether unbacked, such as bitcoin. Also, note that fee payment can take place over period of time and does not have to be immediate nor direct. Also further note that a payment can include a barter exchange between the customer and the DJ instead of and/or in addition to monetary remuneration.

In block 318, a determination is made as to whether the payment has been successfully processed. If yes, process 300 continues to block 320. If not, process 300 continues to block 316. The determination can be performed by any method as known in the art, such as whether a credit card company acknowledges receipt of payment.

In block 320, transaction confirmations are sent to the customer and the DJ. The sending can be performed by any method known in the art, such as email or a text message.

In block 322, upon arrival of a DJ session starting time including the DJ session date, the customer can start receiving a stream from the DJ. For example, when the DJ starting time arrives, the customer signs into the website and, via clicking a link or automatically, is presented with and/or provided access to a stream including the DJ content and images/sounds of the DJ in action. If desired, the customer can output the video on a projector screen and output the audio via speakers.

In block 324, upon arrival of a DJ session ending time, the customer stops receiving the stream from the DJ. The arrival of the DJ session ending time can be determined via a timer. The stopping can be automatic or manual, such as via the DJ or via the customer or a 3rd party.

In block 326, the DJ gets paid. The DJ gets paid from the operator of the website, who already got paid by the customer. Such payment can be direct payment, such as via a bank, or via a financial entity, such as a credit card company or a payment processing company. Such payment can be manually or automatically initiated. A certain percentage can be deducted from the fee payable to the DJ for the operator of the website. Also, the operator can get paid based on interest earned from the fee paid by the customer at the DJ booking date to the DJ session ending time. Such interest can be via a financial entity, such as a bank. For example, on Feb. 1, 2012, for $1000 a customer booked a DJ for a DJ session on Feb. 1, 2013. The operator of the website deposits the received $1000 in a bank account at 10% interest rate. By Feb. 1, 2013, a balance of the bank account grows to $1100. On Feb. 1, 2013, after the DJ performs the DJ session, the operator transfers $1000 to the DJ's bank account and keeps $100 in the bank account. Alternatively, the DJ gets paid via the customer according to block 316 and pays the operator of the website according to block 326 before the DJ session starting time. Otherwise, the operator can block the DJ from performing via the website or using the website until payment is received.

Figure 4:
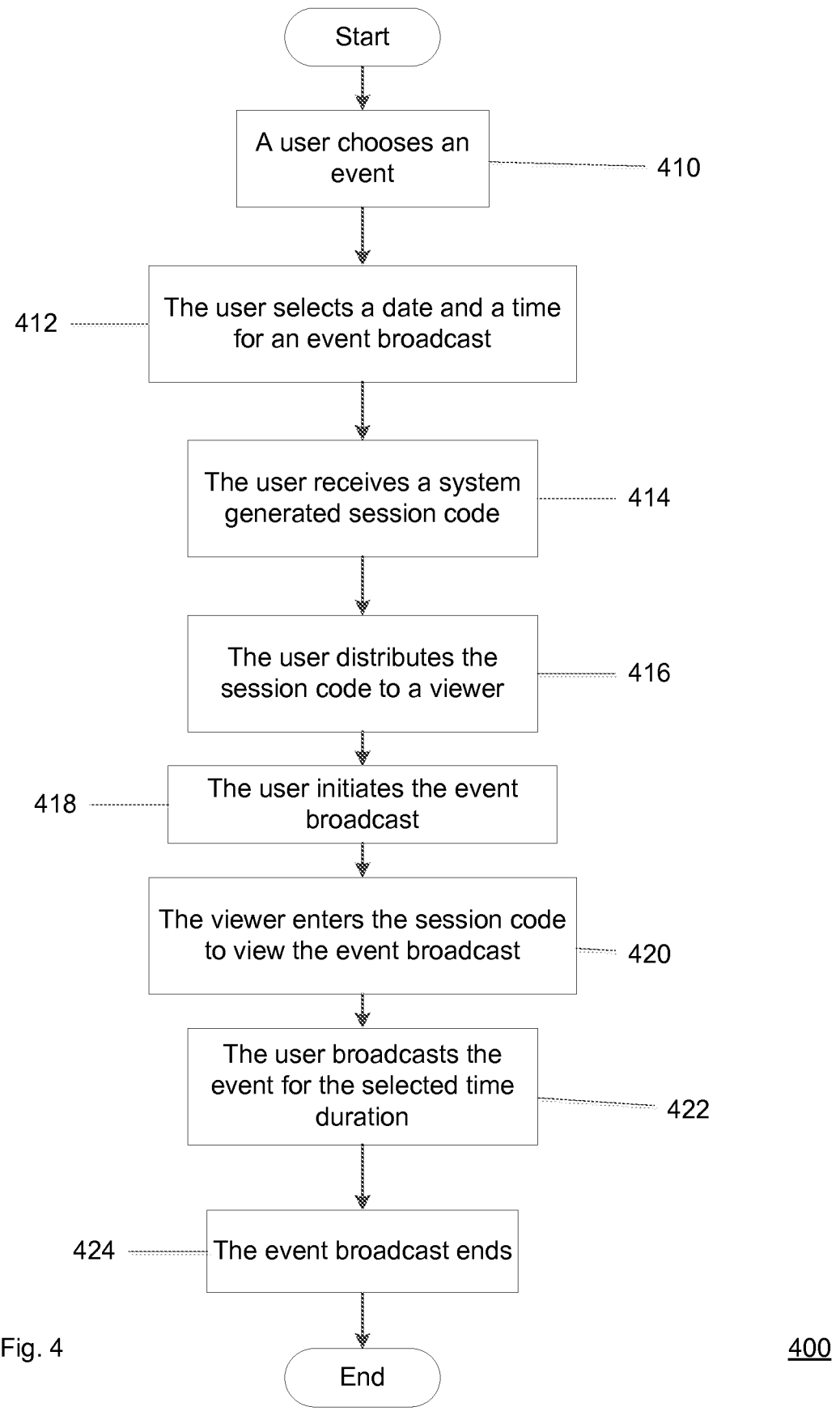
FIG. 4 is a flowchart showing an example embodiment of an event broadcast processing according to the present disclosure.

FIG. 4 is a flowchart showing an example embodiment of an event broadcast processing according to the present disclosure. A process 400 includes blocks 410-424. In context of FIGS. 1 and 2, a user, such as a content publisher, uses process 400 to broadcast an event, such as an entertainer performance. Any portion of process 400 can be implemented on a website. Alternatively, any portion of process 400 can be implemented via a server coupled to a smartphone application running on a user smartphone and an event viewer smartphone.

In block 410, a user, such as a content publisher, chooses an event, such as a concert. The event can be a performance of an entertainer, such as a DJ session, a concert or a solo performance. Note that the publisher can include at least one party and/or at least one entity acting on behalf of the publisher. The publisher can include an entertainer or be devoid of an entertainer.

In block 412, the user selects a date and a time for an event broadcast. The event broadcast can be broadcast over a computer-accessible network, such as Internet.

In block 414, the user receives a session code, which can be manually or system generated or include alphanumeric characters, a hyperlink, a cookie, a biometric or computer identification or any other equivalents thereof or any technology for enabling access to an audiovisual streaming connection. The code can be unique. Alternatively, the session code can be supplied via hardware, as provided to the user, such as SecuriD® technology.

In block 416, the user distributes the session code to a viewer. The session can be distributed via sale or by donation or just given out. Alternatively, the session code can be distributed via hardware, as provided to the viewer, such as SecuriD® technology.

In block 418, the user initiates the event broadcast.

In block 420, the viewer enters the session code to view the event broadcast. The code is entered upon signing into the website or into the smartphone application. Alternatively, the code can be entered via hardware, as provided to the viewer.

In block 422, the user broadcasts the event for the selected time duration. The time duration is selected in block 412.

In block 424, the event broadcast ends. Alternatively, the user halts access to the viewer viewing the broadcast. Such halting can be manual or automatic.

Figure 5:
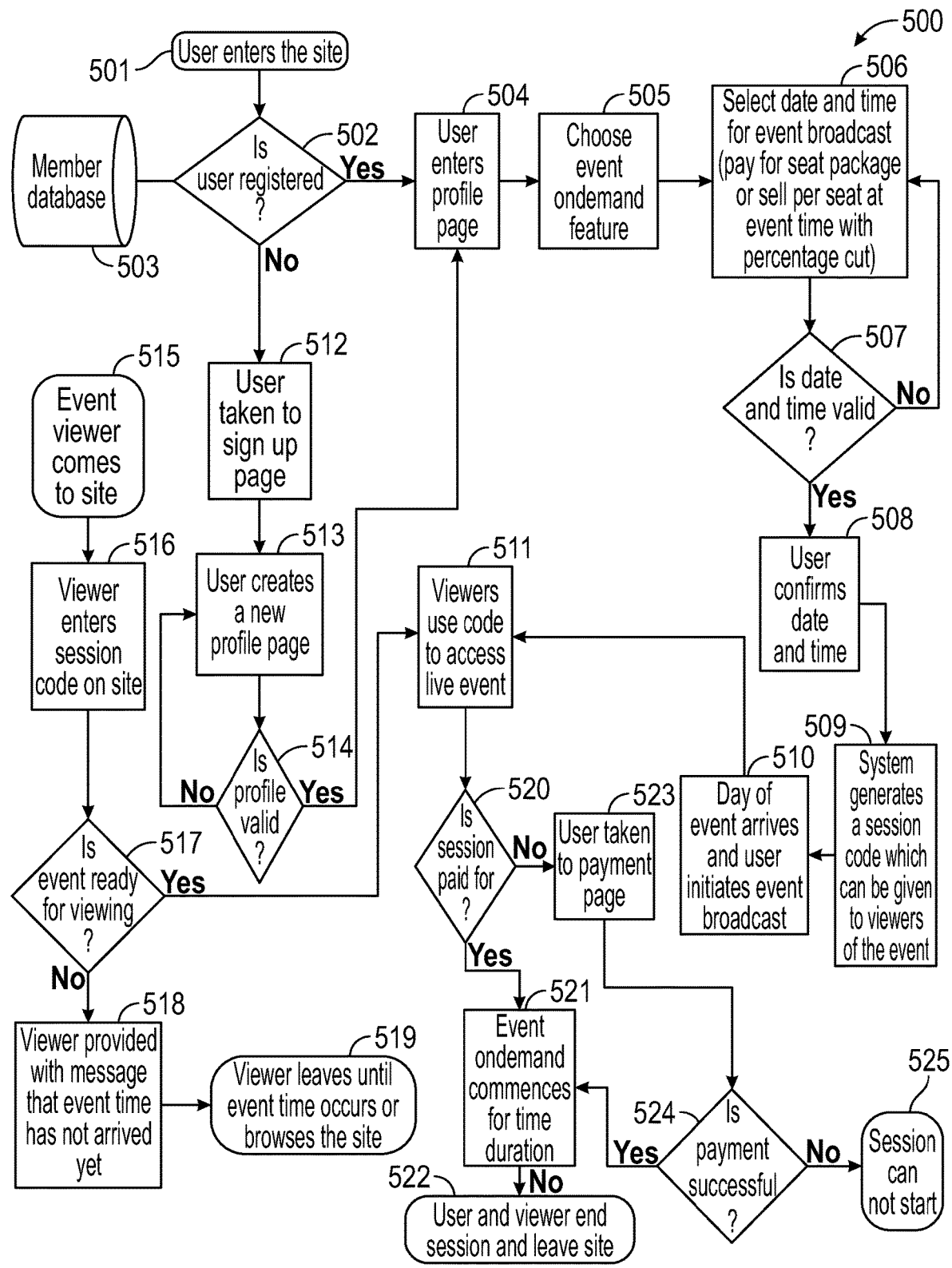
FIG. 5 is a flowchart showing an example embodiment of a viewing process according to the present disclosure.

FIG. 5 is a flowchart showing an example embodiment of a viewing process according to the present disclosure. A process 500 includes blocks 501-525.

In block 501, a user, such as a representative of a venue hosting an entertainer, enters a website, such as via a network or a smartphone application.

In block 502, the user responds whether the user is registered to the website, based on a member database 503. If yes, then process 500 continues to block 504. If not, process 500 continuous to block 512.

In block 504, the user enters a profile page of the website.

In block 505, the user chooses an event on-demand feature of the website.

In block 506, the user selects date and time for the event broadcast. The user can pay for a seat package or sell tickets per seat at event time and take a percentage cut.

In block 507, the website asks whether the selected date and time are valid. If yes, then process 500 continues to block 508. If not, then process 500 continues to block 506.

In block 508, the user confirms the selected date and time.

In block 509, the website generates a session code, which can be provided to viewers of the event.

In block 510, the selected date and time arrive.

In block 511, a viewer uses the session code to access a live event.

In block 512, the user is taken to a signup page on the website.

In block 513, the user creates a new profile page on the website.

In block 514, the website confirms that the profile is valid, such as via sending a response email. If yes, then process 500 continues to block 504. If not, then process 500 continues to block 513.

In block 515, the event viewer accesses the website, such as via a network or via a smartphone application running on a smartphone.

In block 516, the viewer enters the session code into the website.

In block 517, the website determines if the event is ready for viewing. If yes, then process 500 continues to block 511. If not, then process 500 continues to block 518.

In block 518, the viewer is provided with a message that event time has not yet arrived.

In block 519, the viewer leaves the website until event time arrives or browses the website until the event time arrives.

In block 520, the website determines if the session code has been paid for. If yes, then process 500 continues to block 521. If not, then process 500 continues to block 523.

In block 521, the event on-demand commences for a time duration corresponding to the session code.

In block 522, when the time duration expires, the user and the viewer end session and can leave the site.

In block 523, the user is taken to a payment page on the website.

In block 524, the website determines if the payment by the viewer is successful. If yes, then process 500 continues to block 521. If not, then process 500 continues to block 525.

In block 525, the website displays a message indicating that the session cannot start since the payment was not successful.

Figure 6:
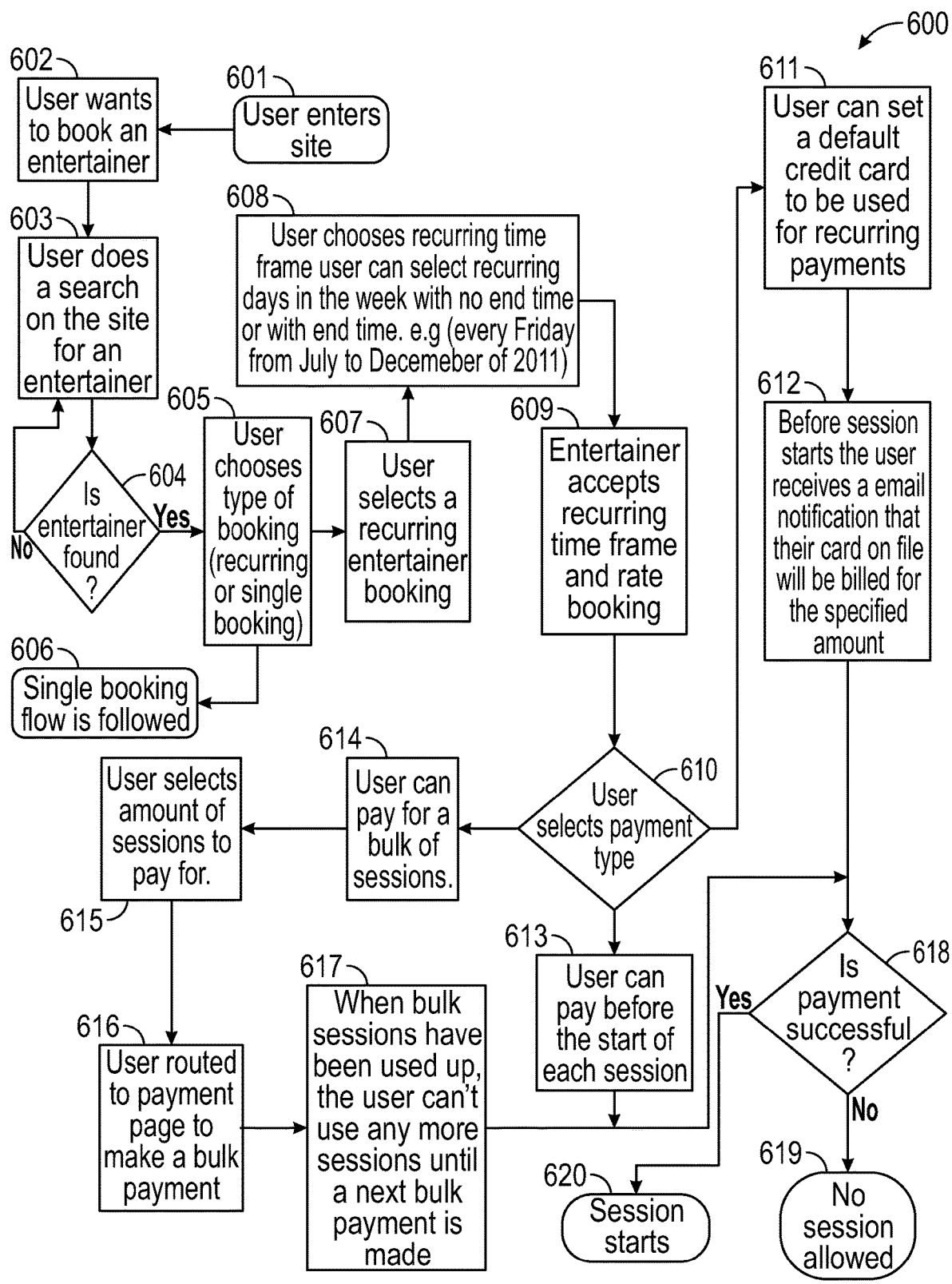
FIG. 6 is a flowchart showing an example embodiment of an entertainer recurring reservation process according to the present disclosure.

FIG. 6 is a flowchart showing an example embodiment of an entertainer recurring reservation process according to the present disclosure. A process 600 includes blocks 601-620.

In block 601, a user enters a website.

In block 602, the user indicates a desire to book an entertainer. Such indication can be via selecting a visual element on the website, such as a link.

In block 603, the user conducts a search on the website for the entertainer.

In block 604, the user decides if the entertainer has been found. If yes, then process 600 continues to block 605. If not, then process 600 continues to block 603.

In block 605, the user selects a booking type, such as booking for a single occasion, a plurality of occasions or a recurring booking. The plurality of occasions can be equally or non-unequally spaced apart. Such booking can include elements from the single occasion booking and/or recurring booking.

In block 606, the user selects a booking type for a single occasion.

In block 607, the user selects the recurring booking.

In block 608, the user proposes a recurring time frame and rate, which is communicated to the entertainer. The frame can be unlimited, limited or with an end date. The time frame can be customized in any way.

In block 609, the entertainer accepts the recurring time frame and rate.

In block 610, the user selects a payment type, such as debit, credit or any other way.

In block 611, the user can set a default credit card to be used for recurring payments.

In block 612, before the entertainer session starts, the user receives a notification, such as an email, notifying that the default credit card will be charged according to the terms as proposed to and accepted by the entertainer.

In block 613, the user pays before the start of each entertainment session by the entertainer. Alternatively, the user can pay when the entertainment session ends.

In block 614, the user can pay for a bulk of entertainment sessions.

In block 615, the user selects the amount of sessions to pay for.

In block 616, the user is routed to a payment page to make a bulk payment for a specific number of entertainment sessions. The user is then credited for the number of prepaid sessions.

In block 617, the user is notified when the bulk sessions have been used up. As a result, the user cannot be given access to any more entertainment sessions until a payment at least for one more session is made.

In block 618, the website determines if the payment has been successful. If yes, then process 600 continues to block 620. If not, then process 600 continues to block 619.

In block 619, the website does not provide access to the user for the entertainment session.

In block 620, the website grants access to the user for the entertainment session.

Figure 7:
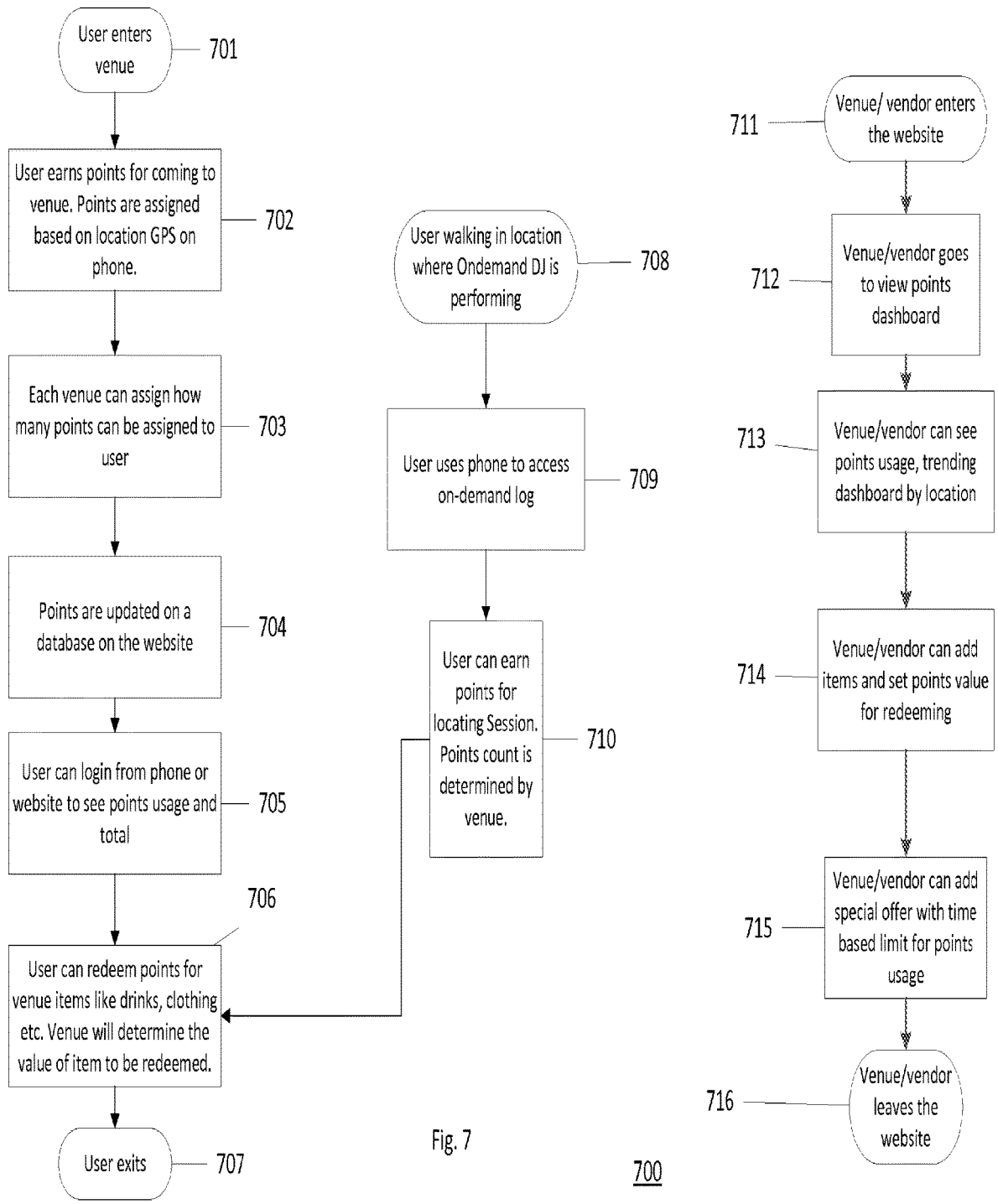
FIG. 7 is a flowchart showing an example embodiment of an incentive points process according to the present disclosure.

FIG. 7 is a flowchart showing an example embodiment of an incentive points process according to the present disclosure. A process 700 includes blocks 701-716.

In block 701, a user enters a venue, such as a club.

In block 702, the user is credited with points for attending the venue. Points can be automatically credited based on location as determined via a global positioning system (GPS) on the user's phone when the user's phone is running a smartphone application for the website.

In block 703, each venue can use various incentive points schemes and thus can assign in any way how many points the user earns by attending the venue.

In block 704, when points are assigned or used, the points are updated on a database on the website.

In block 705, the user can login into the website or via the application running on the phone and determine the user's points usage and total.

In block 706, the user can redeem points for venue items, such as drinks or clothing. The venue determines the point value of the redeemed venue item.

In block 707, the user leaves the venue.

In block 708, the user walking around a location where on-demand entertainer, such as a DJ, is performing.

In block 709, the user uses the phone to access the on-demand log, such as information including who performs what where and when and/or for a specific instance.

In block 710, the user earns points for locating the entertainment session. The points for locating the session are determined by the venue where the entertainer is performing.

In block 711, a venue operator or a vendor enters the website.

In block 712, the venue operator or the vendor views point assignments and redemptions on a points dashboard.

In block 713, the venue operator or the vendor the dashboard shows points usage and trending by locations.

In block 714, the venue operator or the vendor adds items for points redemptions and corresponding point values for the added items.

In block 715, the venue operator or the vendor adds a special offer with time-based limit for points usage.

In block 716, the venue operator or the vendor leaves the website.

Figure 8:
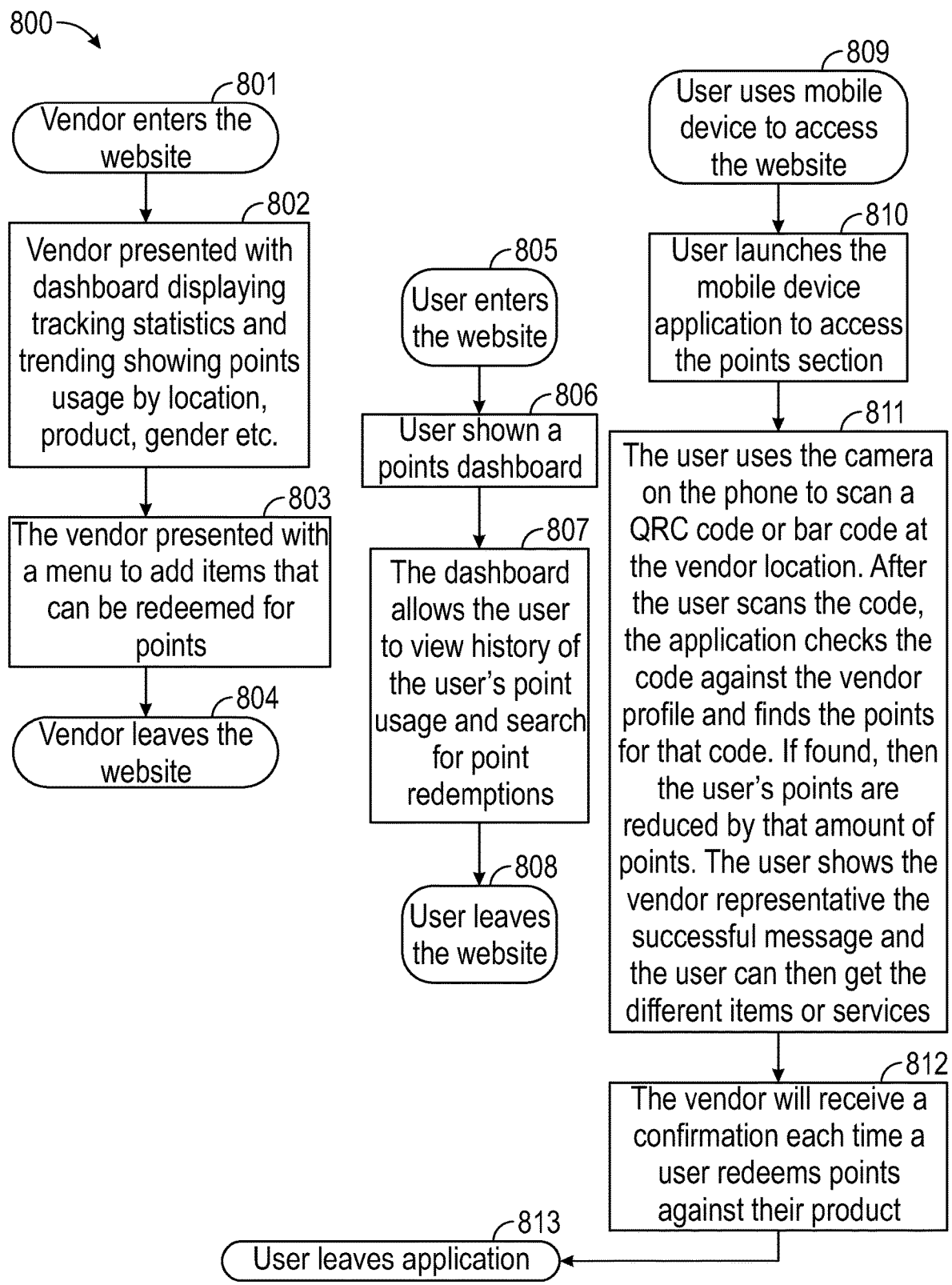
FIG. 8 is a flowchart showing an example embodiment of an incentive points process according to the present disclosure.

FIG. 8 is a flowchart showing an example embodiment of an incentive points process according to the present disclosure. A process 800 includes blocks 801-813.

In block 801, the vendor enters the website.

In block 802, the vendor is presented with dashboard displaying tracking statistics and trending showing points usage by various characteristics, such as location, product, and gender.

In block 803, the vendor presented with a menu to add items that can be redeemed for points. For example, the menu displays fields for adding a product to the points system. The fields can be product code stock-keeping unit (SKU), a product name, a product description, a points value, a special points discount, duration of discount, notes.

In block 804, the vendor leaves the website.

In block 805, the user enters the website.

In block 806, the user is shown a points dashboard.

In block 807, the dashboard allows the user to view history of the user's point usage. The user can also search for products to redeem the points with. The search for items is by vendor where the user is shown a page with vendors and the user selects a vendor to drill into the vendor's products. The search can also be by category, such as electronics, computers, software, clothing, jewelry, gift cards, restaurants coupons, travel trips, household products, and kitchen products. The user can redeem points by inviting friends from social networks and micro-blogs to join the website. If the friend joins the site, then the user that invited the friend gets points for such joining from credited by the website. The website can have a currency for points system, such as a spent dollar corresponding to a point. The website can have a different incentive system for entertainers, such as entertainers having special badges earn more points than the normal user. The user can use the dashboard to view the points usage also by vendor, category and products.

In block 808, the user leaves the website.

In block 809, the user uses mobile device to access the website.

In block 810, the user launches the mobile device application to access the points section.

In block 811, the user uses the camera on the phone to scan a quick response code (QRC) code or bar code at the vendor location. After the user scans the code, the application checks the code against the vendor profile and finds the points for that code. If found, then the user's points are reduced by that amount of points. The user shows the vendor representative the successful message and the user can then get the different items or services, such as entry into the venue, drinks, clothing, products, food, and movie tickets. The user can play trivia games on the phone to earn more points.

The mobile application can include augmented reality functionality for allowing the user to earn points by over layering the location of the on-demand entertainer, such as a DJ, on a real world location. For example, the entertainer can be in New York City walking on the street and the application is used via the camera and augmented reality tools to play trivia games by having the user point the camera at buildings and streets and to determine if an on-demand entertainer, such as a DJ, is in the location. The user figures out the entertainer information like name of the entertainer, entertainer style, and entertainer studio location. The application can also include or be coupled to a web mapping service application in the phone to play more trivia games by showing the entertainers in a geographic area performing on-demand sessions and showing the entertainer name and use trivia multiple choice questions to figure out the entertainer skill, style, location.

In block 812, the vendor will receive a confirmation each time a user redeems points against their product.

In block 813, the user stops using the mobile device application.

Figure 9A:
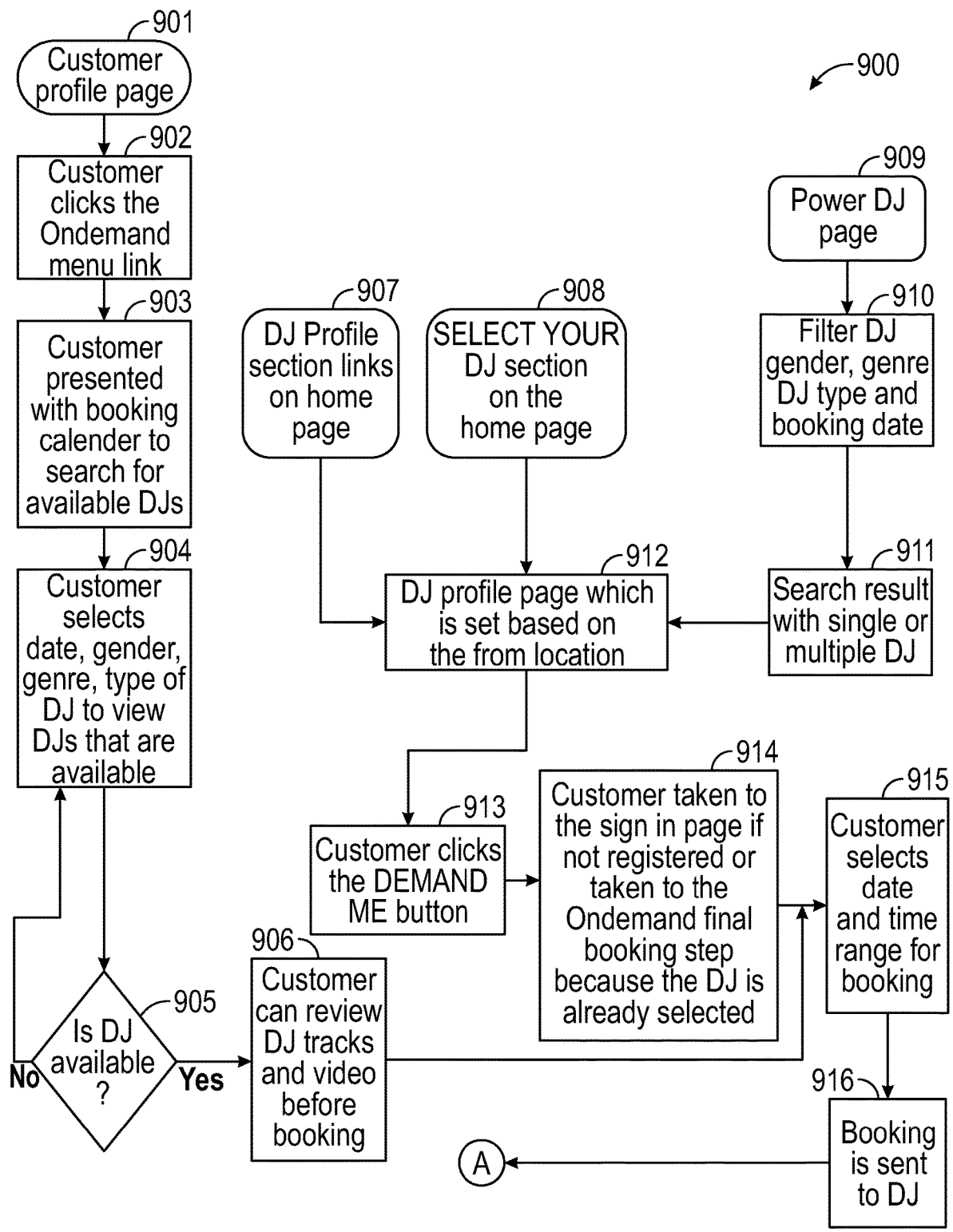
FIGS. 9A and 9B is a flowchart showing an example embodiment of an entertainer reservation process according to the present disclosure.
Figure 9B:
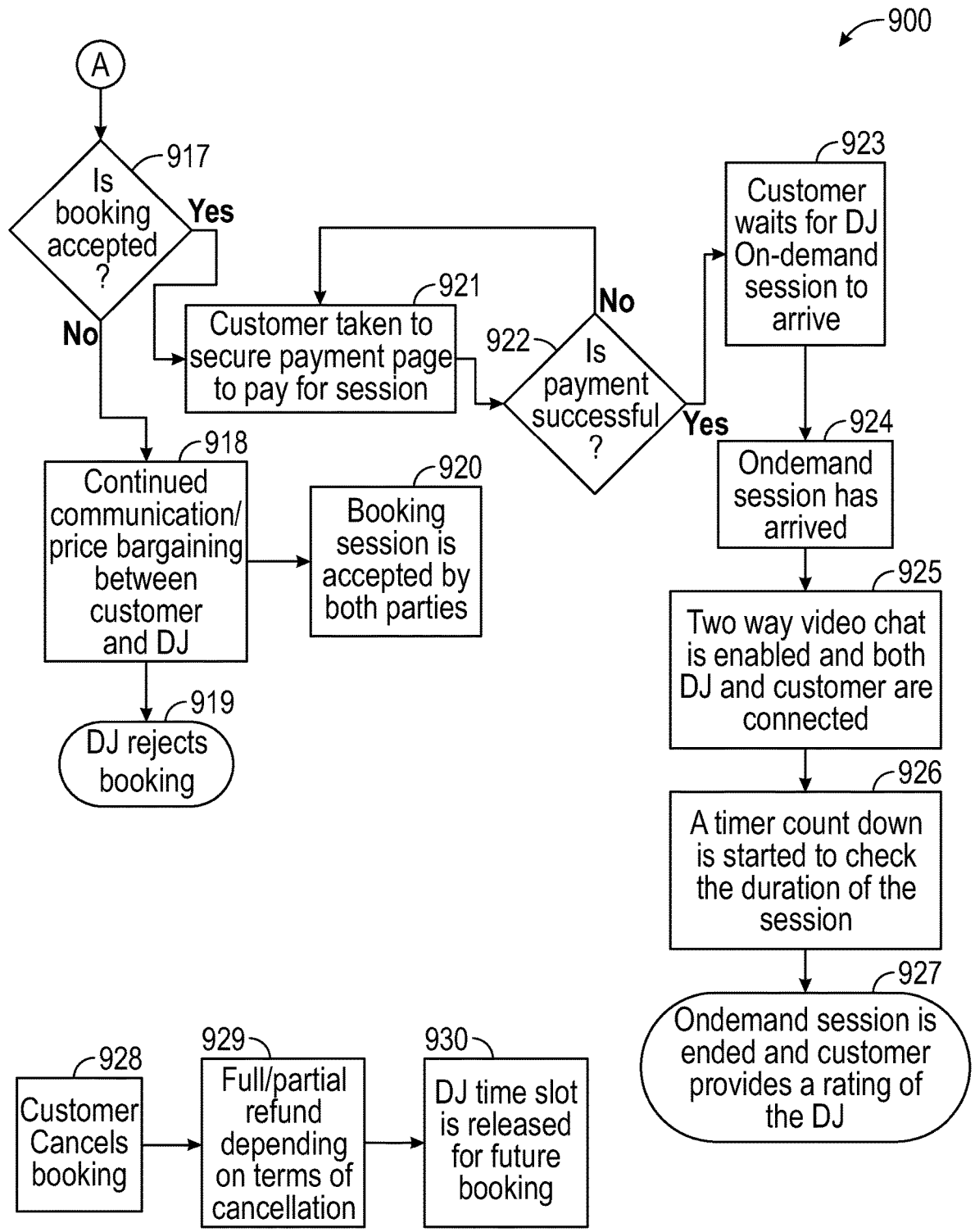

FIGS. 9A and 9B is a flowchart showing an example embodiment of an entertainer reservation process according to the present disclosure. A process 900 includes steps 901-930.

In block 901, a customer accesses a customer's profile page on a website.

In block 902, the customer clicks a link to have entertainment on-demand.

In block 903, the customer is presented with a booking calendar to search for available entertainers, such as DJs.

In block 904, the customer selects date, gender, genre, and type of entertainer from the entertainers that are available.

In block 905, the website determines if the entertainer is available for booking. If yes, then process 900 continues to block 906. If not, process 900 continues to block 904.

In block 906, the customer reviews entertainer preview tracks/video clips before booking.

In block 907, the customer clicks a link to an entertainer profile section on a homepage of the website.

In block 908, the customer clicks select your entertainer portion of the homepage.

In block 909, the customer accesses a power entertainer webpage.

In block 910, the customer filters a list of entertainers by gender, genre, entertainer type and booking date.

In block 911, the website returns a search result with a single or multiple entertainers matching the criteria as input by the customer.

In block 912, the customer accesses the entertainer's profile page, which is set based on the location of the customer. Thus, the times and dates correspond to the time zone of the customer.

In block 913, the customer clicks demand entertainer button.

In block 914, the customer is taken to the sign-in page if the customer is not registered or taken to the booking step because the entertainer is already selected.

In block 915, the customer selects a fee, a date and a time range for booking the entertainer in the future.

In block 916, the customer's proposed fee, date and the time range are sent to the entertainer.

In block 917, the entertainer determines whether the entertainer accepts the customer's proposal. If yes, then process 900 continues to block 921. If not, then process 900 continues to block 918.

In block 918, the website allows continued bargaining communications between the entertainer and the customer with respect to at least one of a time, a date and a fee or any other terms. Such communications can be compact, set by rules or be unlimited for any period of time.

In block 919, the entertainer rejects the proposal from the customer, who can now search for an alternative entertainer with a new proposal or an identical proposal.

In block 920, the entertainer and the customer come to terms and form an agreement in the bargaining process between the customer and the entertainer. The agreed terms include time, date and fee.

In block 921, the customer is taken to a secure payment webpage to pay according to the agreed terms. The payment can be made in any way, such as via a credit or a debit card.

In block 922, the website determines if the payment is successful. If yes, then process 900 continues to block 923. If not, then process 900 continues to block 921.

In block 923, the customer waits for the agreed time and date.

In block 924, the agreed time and date arrive.

In block 925, the website grants access to a bidirectional audiovisual streaming connection between the customer and the entertainer, who can also chat with each other.

In block 926, a timer is started to show remaining time. The timer can be a countdown or count up timer. The timer is shown during the session.

In block 927, the time period expires and the website halts access to the streaming connection. The customer provides a rating for the entertainment session. The rating is posted on the profile of the entertainer.

In block 928, the customer cancels the booked reservation of the entertainer.

In block 929, the website allows for full or partial refunds depending on the terms of cancellation, as determined either by the website or the entertainer. The website can have blanket terms for cancellation or heuristic rules automatically applied to the cancellation to determine the refund. The cancellation can also depend on the terms as agreed between the entertainer and the customer.

In block 930, in response to the cancellation, the website avails the entertainer for other reservations during the cancelled time and the date.

Figure 10:
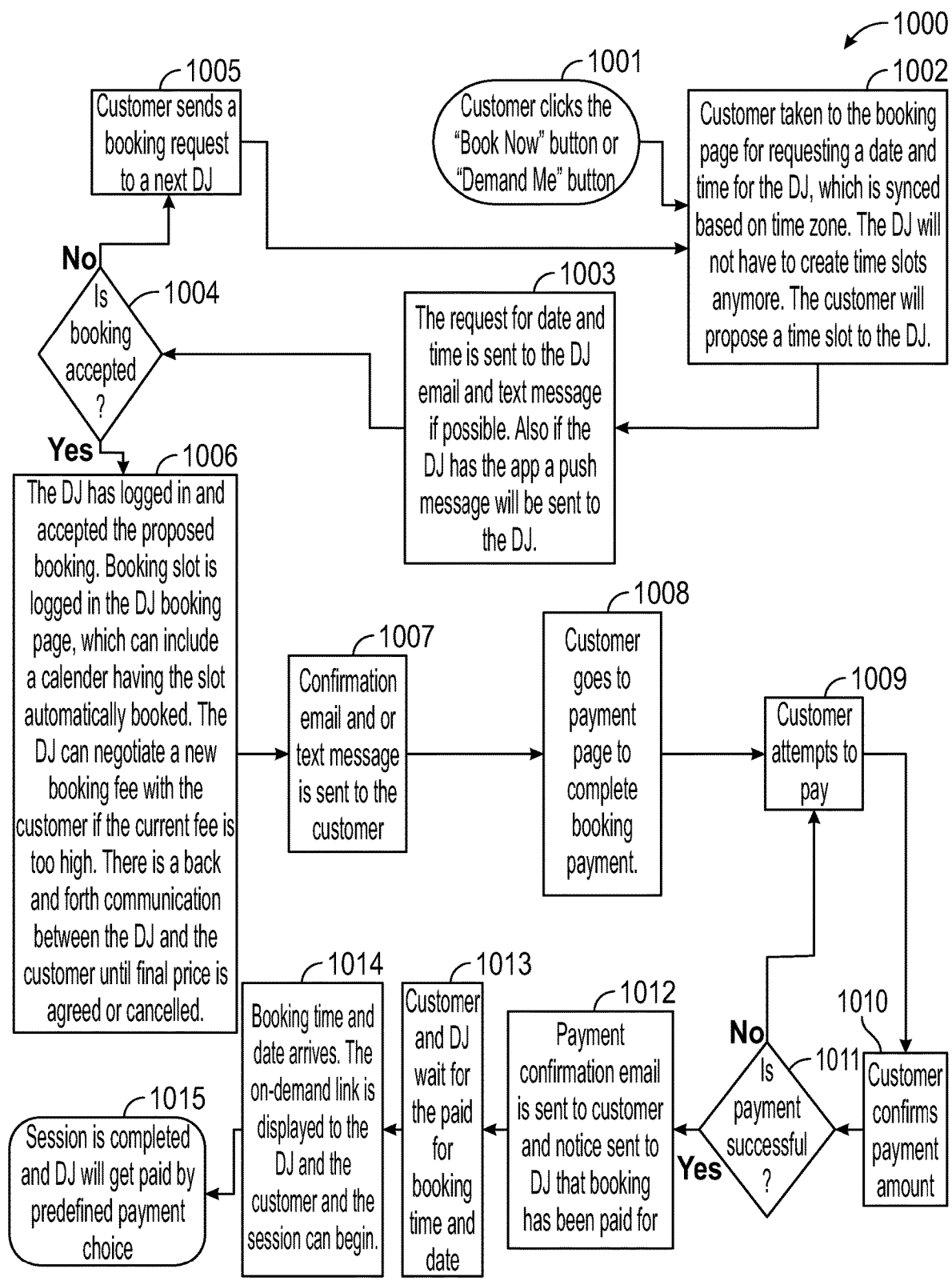
FIG. 10 is a flowchart showing an example embodiment of an entertainer reservation process according to the present disclosure.

FIG. 10 is a flowchart showing an example embodiment of an entertainer reservation process according to the present disclosure. A process 1000 includes blocks 1001-1015.

In block 1001, the customer clicks the book now button or demand the entertainer button. The buttons are accessible on the website.

In block 1002, the website directs the customer to the booking page for requesting a date and time for the entertainer, which is synced based on time zone. The entertainer does not have to manually create time slots anymore. The customer proposes a time slot to the entertainer.

In block 1003, the website directs the request for date and time to the entertainer via email, internal or external, and text message if possible. Also if the entertainer has the mobile application, then a push message is sent to the entertainer.

In block 1004, the website waits for acceptance or rejection of the customer's proposal to the entertainer. If yes, then process 1000 continues to block 1006. If not, then process 1000 continues to block 1005.

In block 1005, the entertainer rejected the customer's proposal. The customer sends a booking request to another entertainer.

In block 1006, the entertainer has logged in and accepted the proposed booking. Booking slot is logged in the entertainer-booking page, which can include a calendar having the slot automatically booked. The entertainer can negotiate a new booking fee with the customer if the current fee is too high. There is a back and forth communication between the entertainer and the customer until final price is agreed or cancelled.

In block 1007, the confirmation email and/or text message is sent to the customer.

In block 1008, the customer is directed to a payment webpage to complete payment corresponding to the agreed proposed booking. The entertainer can place a time limit on the duration of the agreement. For example, the terms of the reply only last for the next four hours.

In block 1009, the customer attempts to pay. The attempts can be via any known method of payment, such as a credit card or a debit card.

In block 1010, the customer confirms payment amount.

In block 1011, the website determines if the customer's payment is successful. If yes, then process 1000 continues to block 1012. If not, then process 1000 continues to block 1009. Such determination can be via any method known in the art, such as receipt of a confirmation from a payment processor.

In block 1012, the website sends a payment confirmation email to the customer and notice sent to the entertainer that booking has been paid for. Such confirmation can be sent in any way including to the mobile application.

In block 1013, the customer and the entertainer wait for the paid for booking time and date.

In block 1014, the booking time and date arrive. When accessing the website, the customer and the entertainer are shown a hyperlink, which upon clicking initiates a bidirectional streaming connection between the customer and the entertainer who can chat to each other. The entertainer performs the live entertainment performance.

In block 1015, when the time period expires, the entertainer gets paid from the website by a predefined method of choice.

Figure 11:
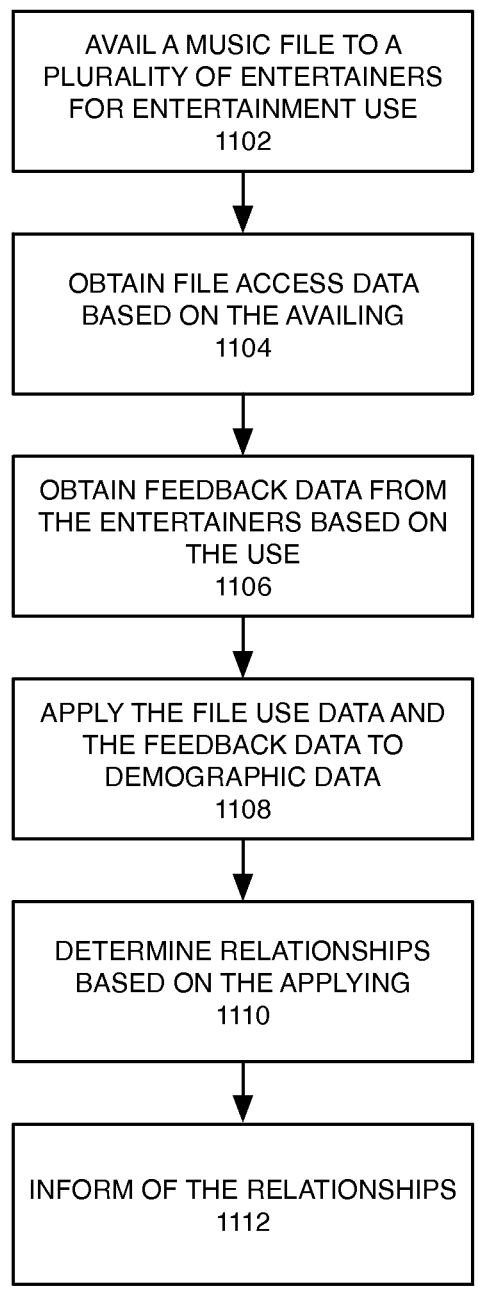
FIG. 11 is a flowchart showing an example embodiment of an entertainment trending process according to the present disclosure.

FIG. 11 is a flowchart showing an example embodiment of an entertainment trending process according to the present disclosure. A process 1100 includes a plurality of blocks 1102-1112. Process 1100 can be performed via a computerized manner.

In block 1102, an entity avails a music file to a plurality of entertainers for entertainment use. The entity can include an operator of a website, a performer and/or a music record label. The availing including uploading and/or sharing, such as via a network protocol, which can be peer-to-peer and/or non-peer-to-peer. The file can include a MP3 file, a WAV file and so forth. Alternatively, the music file can include at least a portion of network stream. The file including at least one sound performance, but can include a plurality of sound performance, whether related or unrelated to each other in any way. The file including at least a sound performance, but can include a video performance as well, which can be of the sound performance or some other performance, act and/or event. The video performance can be any type, such live, recorded and/or so forth. The sound performance can include any sound performance, such as a song, an opera tune, an instrumental piece, a classical piece, a mix, a choice, an orchestra, a band and/or any other sound performance. The entertainers can include as described herein. The entertainment use including using the file during an entertainment session, such as a DJ session. Such availing is via a server.

In block 1104, the entity obtains file access data based on the availing. The file access data including information relating to access of the file, such as who accessed the file, when the file was accessed, from where was the file accessed, how many accesses were there, what type of file access, such as stream and/or download, how was the file accessed, and/or so forth. Such obtaining can be performed in real-time, delayed manner or periodically. Such access data is stored in a database.

In block 1106, the entity obtains feedback data from the entertainers based on the use of the file. The feedback including information relating to how audience is reacting to playing the file, how did the entertainer perform the song, various song and/or entertainer performance characteristics, various locale characteristics and/or so forth. Such obtaining can be performed in real-time, delayed manner or periodically and/or can include a questionnaire. For example, the feedback can be based at least in part on a mode of file play, such as a gig play mode, a club play mode, a radio play mode, a push more mode, a make video mode, a buy song mode and/or others. The feedback can also be based at least in part on content characteristics, such as vocals, beat, tempo, genre, performer and/or so forth. Such feedback data is stored in a database.

In block 1108, the entity applies the file use data and the feedback data to demographic data. The applying including correlating. The demographic data can include private data, public data and/or any combination thereof. The demographic data can include census data. The demographic data can include information such as income, gender, location, race, education, ethnicity, household data, criminal data, age, health, business ownership, technology usage and/or so forth. The demographic data can include any quantifiable statistics of any given population. The demographic data can include at least one quantifiable subset within a given population sample which characterize that population at a specific point in time. The demographic data can include projected statistical data. The demographic data can include domestic data, international data and/or any other combination thereof. Such application can be performed in real-time, delayed manner or periodically. Such application via a server.

In block 1110, the entity determines relationships based on the applying. The entity can determine trending information for the performer, the collection of songs and/or the song. The trending information can include future projections for the performer, the collection of songs and/or the song. The trending information can be used for prediction and/or forecasting for improved marketing and/or promotions. Such determination can be performed in real-time, delayed manner or periodically. Such determination can include data, such as download count by location, listen count by location, social network post counts, feedback by location and live session play info by location.

In block 1112, the entity is informed of the relationships. Such informing can be done via any visual manner, such as graphs, charts, diagrams, texts, grids and/or others. Such informing allows obtaining predictive results on demographic shifts in music likes and map correlations between any aspect of demographic data, such as income, age, education, location, sex, race and so forth, and music consumptions based on the entertainers. Such informing can be via localized, remote and/or any other computing manner. Such informing allows the entity to determine where music is trending in different locations based on past trends and predictive analysis for future music likes by locations. Such informing also allows the entity to determine where to focus marketing resources and/or touring based on the DJs trending data and which locations is using their songs the most. Such informing also allows the entity to track their content and focus marketing resources instead of going to random locations and cities for promotion. Such informing can be performed in real-time, such as via alerts, including at least one of a message, like an email, a text message, an app message and/or so forth. Such informing can also be performed on a delayed basis or periodically.

Figure 12:
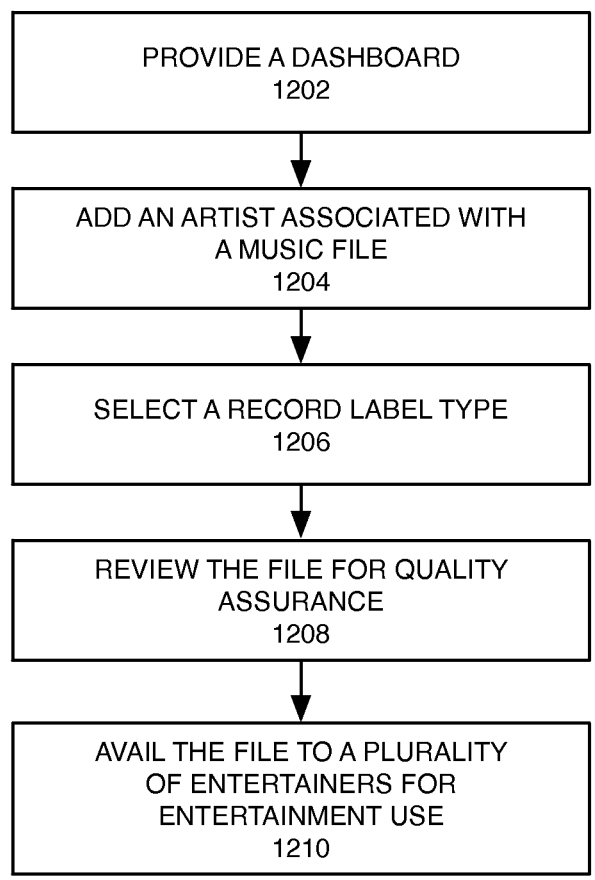
FIG. 12 is a flowchart showing an example embodiment of a content availing process according to the present disclosure.

FIG. 12 is a flowchart showing an example embodiment of a content availing process according to the present disclosure. A process 1200 includes a plurality of blocks 1202-1210. Process 1200 can be performed via a computerized manner. Process 1200 can be performed in context of any portion of process 1100, such as for block 1102.

In block 1202, a dashboard is provided. Such provision can be based at least in part on entry of the entity into a portal and/or a website. The dashboard provides stats for a predefined music file. The dashboard contains a download count of the file from DJs, the listen count of the file from the DJs, a numerical value corresponding to live plays of the file from the DJs in their performances via info provided by a real-time tracker software running on the DJ's computing systems, such as a laptop, a chart showing feedback from the DJs, such as for the radio play mode, the club play mode, the push more mode, the make video mode, the buy song mode and/or so forth, a chart including a file rating of a 1-5 range that covers what the DJ thinks about the file beat, vocals, genre and/or overall file content. The dashboard can include a menu option for at least one of a real-time alert, an artist assignment, a feedback, an upload file and a trending chart.

In block 1204, an artist is added. The artist is associated with the music file.

In block 1206, a selection of record label is made. The selection can be of a major label, an indie label and/or others. The label can avail, such as via uploading, their own files. The availing can be fee based, whether on a per file basis, on a time basis, a user basis, an availability basis and/or others. The fee can depend on a product and/or service package, such as a DJ pack, which can include a combination of files of any genre and/or any combination of genres, such as clean, dirty, acapella, instrumental and/or so forth.

In block 1208, the file is reviewed for quality assurance. Such assurance can be manual and/or automatic. Such assurance cab performed via the entity. Such assurance including a review of the file for quality and/or format.

In block 1210, upon successful quality assurance review, the file is approved and added in a categorized manner, such as specified genre and/or music category, for the DJs to review and/or download for play and feedback.

Figure 13:
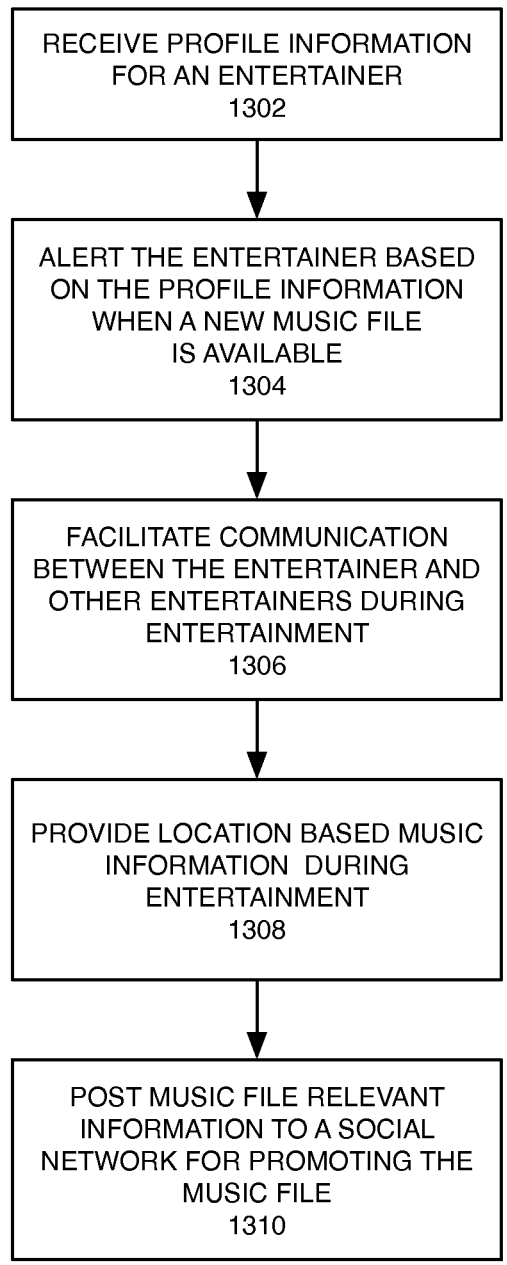
FIG. 13 is a flowchart showing an example embodiment of a entertainer functionality enhancement process according to the present disclosure.

FIG. 13 is a flowchart showing an example embodiment of a entertainer functionality enhancement process according to the present disclosure. A process 1300 includes a plurality of blocks 1302-1310. Process 1300 can be performed via a computerized manner. Process 1300 can be performed in context of any portion of process 1100 and/or 1200.

In block 1302, profile information for an entertainer is received. The profile information including personal information, contact information, entertainment information and/or so forth. Such receiving can include the entertainer registering with a portal and/or a website, whether related or unrelated to entertainment.

In block 1304, the entertainer is alerted based at least in part on the profile information when a new music file is available. Such alerting can be during an entertainment session and/or via entertainer's equipment, such as a laptop computer, a tablet computer and/or a smartphone. The equipment can run entertainment software, such as DJ software, which can communicate over network and/or connect a network, such as Internet. Such software can run at background and sends an alert in real-time back to the entity, such as a label and/or an artist, about where the file is being played and by which entertainer. Such software can also alert the entertainer when a new file, which matches at least one criteria of the entertainer's profile, is added to a computer system for the entertainer's availability. Such matching can also include matching based at least in part on the entertainer's use history according to records available to and/or in the computer system.

In block 1306, a communication between the entertainer and other entertainers is facilitated during an entertainment session. The entertainer can communicate with other entertainers, whether domestically and/or globally, that are in live entertainment sessions in order to determine what type of content, such as a music playlist, is being used in other areas. Such communication can include emailing, texting, messaging, chatting, calling, videoconferencing and/or others. The entertainer can communicate in real-time with other entertainers to build their social network profile and/or connections.

In block 1308, location based music information is provided during entertainment. The entertainer can determine what type of music is played around the world or in a location that the entertainer is going to be traveling too. Such determination is via pictorial and/or graphical means.

In block 1310, music file relevant information is posted to a social network for promoting the music file. Such posting can be manual and/or automatic. Such posting promotes the file and can promote the entertainer.

Figure 14:
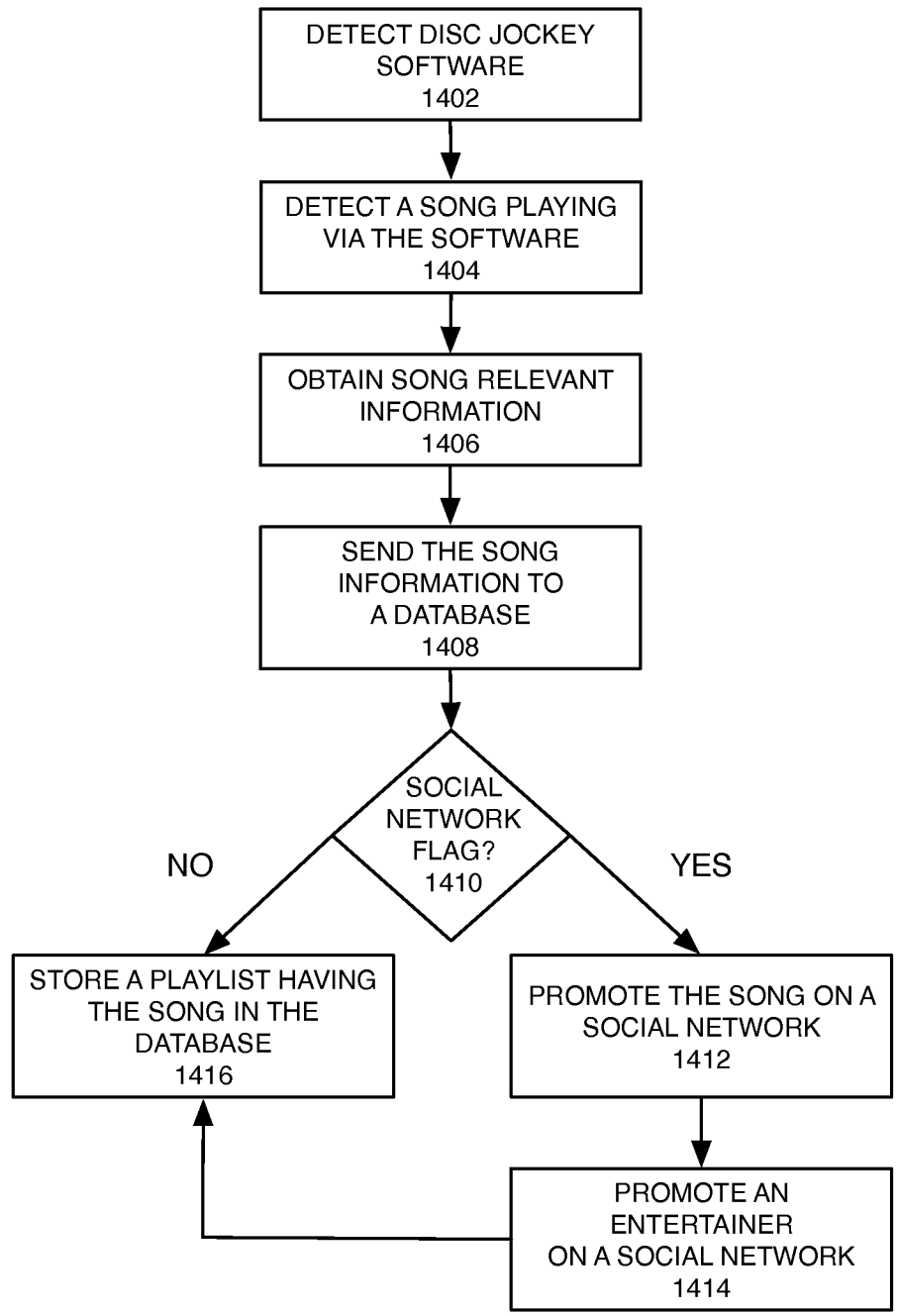
FIG. 14 is a flowchart showing an example embodiment of a DJ performance process according to the present disclosure.

FIG. 14 is a flowchart showing an example embodiment of a DJ performance process according to the present disclosure. A process 1400 includes a plurality of blocks 1402-1416. Process 1400 can be performed via a computerized manner. Process 1400 can be performed in context of any portion of process 1100, 1300 and/or 1200.

In block 1402, DJ software is detected. Such detection can be local and/or remote based. Such detection can include via logic, whether software and/or hardware based. For example, the logic can include a background running module. The DJ software, such as Serato®, Traktor® and/or others, is launched for an entertainment session, whether at the session or remotely from the session. The DJ can be inquired whether to track usage based on previously stored usage information or from anew for the session.

In block 1404, a song playing via the DJ software is detected. Such detection can include monitoring audio output, monitoring the DJ software, prompting user and/or others. Such detection can include playlist detection of the DJ software as well. Such detection can include detecting song addition onto a playlist of the DJ software.

In block 1406, song relevant information is obtained. Such information includes performer, time, date, duration, location, content and/or others. Such information can also include DJ identifying information, such as name, location, computer, time, date and/or others.

In block 1408, the song relevant information is sent to a database. Such sending can include wired and/or wireless sending, whether direct and/or indirect in any manner. Such sending can be periodical, in real-time, customizable and/or others. Other entities, such as a music record label, an artist, a performer and/or others, can view such information as retrieved from the database, such as via a software application, a web portal and/or others. Such information can be correlated with demographic information, as described herein. For example, such information can be displayed on a website in map view and/or statistical charts and/or reproduced in at least one report, which can be dynamically updated and/or static.

In block 1410, a social network flag determination is made. Such flag is indicative whether to promote at least one of an audio content and an entertainer, such as the DJ, on at least one social network. Such flag, as selectively user input into the logic described herein, can be set anytime, such as before and/or during the entertainment session. If such flag is set to yes, then at least one of block 1412 and block 1414 are performed in any order. If such flag is set to no, then block 1416 is performed.

In block 1412, the song is promoted on the social network. The promotion can include wall posting, messaging and/or others. The promotion can occur contemporaneously on multiple social networks and/or selectively promoted based at least in part on the song's popularity, such as most popular promotion is first, then less popular and so forth. Such promotion can be periodic, in real-time and/or user selected and/or customizable.

In block 1414, the DJ is promoted on the social network. The promotion can include wall posting, messaging and/or others. The promotion can occur contemporaneously on multiple social networks and/or selectively promoted based at least in part on the DJ's popularity, such as most popular promotion is first, then less popular and so forth. Such promotion can be periodic, in real-time and/or user selected and/or customizable.

In block 1416, a playlist having the song is stored in the database. Such storage can be remote is for future retrieval by the DJ. Such storage can also include local storage on local machine. Such playlist can be used for various data extraction and/or modeling to determine song and/or DJ popularity and/or trends.

Figure 15:
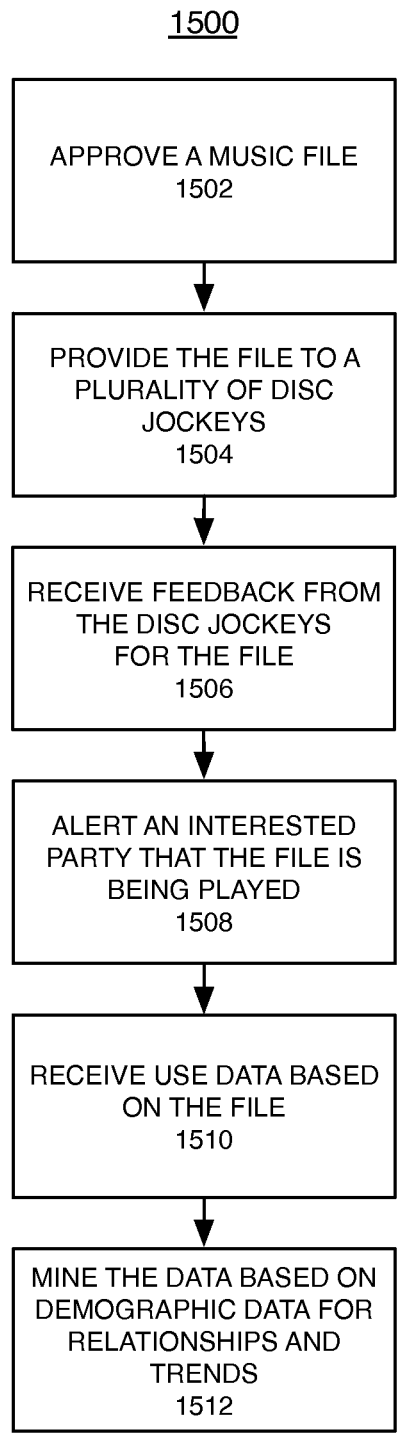
FIG. 15 is a flowchart showing an example embodiment of a DJ entertaining process according to the present disclosure.

FIG. 15 is a flowchart showing an example embodiment of a DJ entertaining process according to the present disclosure. A process 1100 includes a plurality of blocks 1102-1112. Process 1500 can be performed via a computerized manner. Process 1500 can be performed in context of any portion of process 1100, 1300, 1400 and/or 1200.

In block 1502, a music file is approved. Such file can be via a music record label, an entertainer, a service/website/portal operator and/or others. The label can include a major label, an indie label and/or others. When the major label avails the file, such as via uploading, then there is no fee for the label or artist for the availing. The file is provided via an interface, such as an administrative panel, for approval. When the indie label avails the file, such as via uploading, then the indie can be charged a fee. The file can be a part of a product, such as a plurality of any two combinations of a clean genre, a dirty genre, an acapella genre, an instrumental genre and a radio edit genre. If the file is a part of a product, then one fee can be charged, but if the file is a single file, then another different fee can be charged, which can be higher that the one fee. Upon payment, the file is provided via an interface, such as an administrative panel, for approval. When the entertainer avails the file, such as via uploading, the file is provided via an interface, such as an administrative panel, for approval.

In block 1504, the file is provided to a plurality of DJs. Regardless of who and/or how availed the file, the file is available for the DJs to view and/or download.

In block 1506, feedback from the DJs for the file is received. The DJs listen and/or download the file and provide feedback for the file based at least in part on at least one of a gig play mode, a club play mode, a radio play mode, a push more mode, a make video mode, a numerical beat rating, a numerical vocal rating, a numerical overall rating and/or others.

In block 1508, an interested party is alerted that the file is being played. Such alerting can be periodic, in real-time, user selected and/or user customizable.

In block 1510, use data based on the file is received. The use data including information about which DJ is playing the file, when the file was played, where the file was played, how many times the file was played, to whom the file was played and/or others.

In block 1512, the data is mined for relationships and/or trends based at least in part on demographic data. For example, the data is used to trend genre changes by location based on census data and DJ information. The census data can include information from prior years. Such census data can aid in trend determination via use file data data to predict future trends in music and specific artist growth. The artist can use the data to find out what is the demographic break down of any area around the world where their track is popular or not popular. Such processing provides the artist with a more precise way to figure out the buzz and/or popularity of their music and use less marketing money to promote in the right areas. Via the DJs, such technology enables collective control of the growth of the song and hence song movement up the charts.

FIGS. 16A-16M are a plurality of screenshots showing a plurality of example embodiments of entertainment trending according to the present disclosure.

Figure 16A:
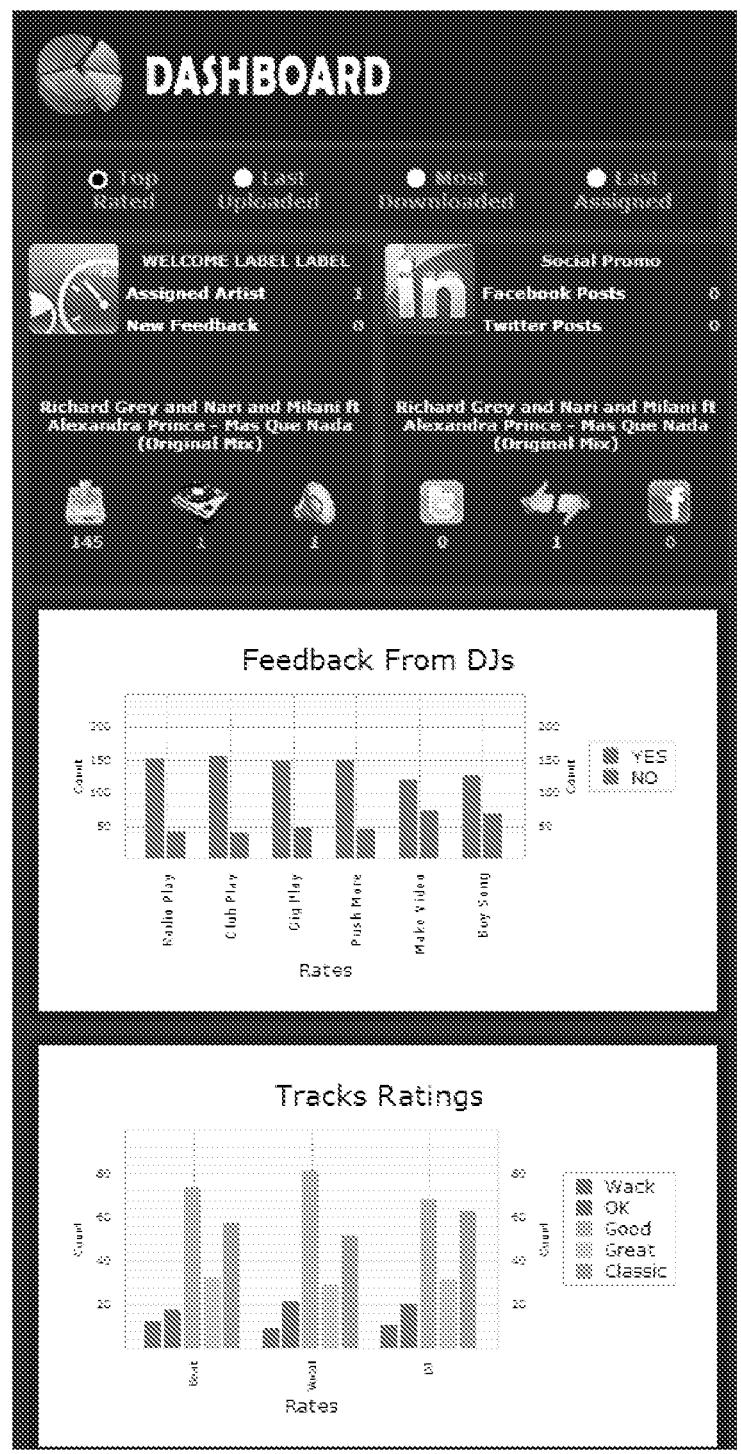
FIGS. 16A-16M are a plurality of screenshots showing a plurality of example embodiments of entertainment trending according to the present disclosure.

FIG. 16A allows a user to see dashboard stats about their files for total downloads, total live plays, total listens and total social network postings.

Figure 16B:
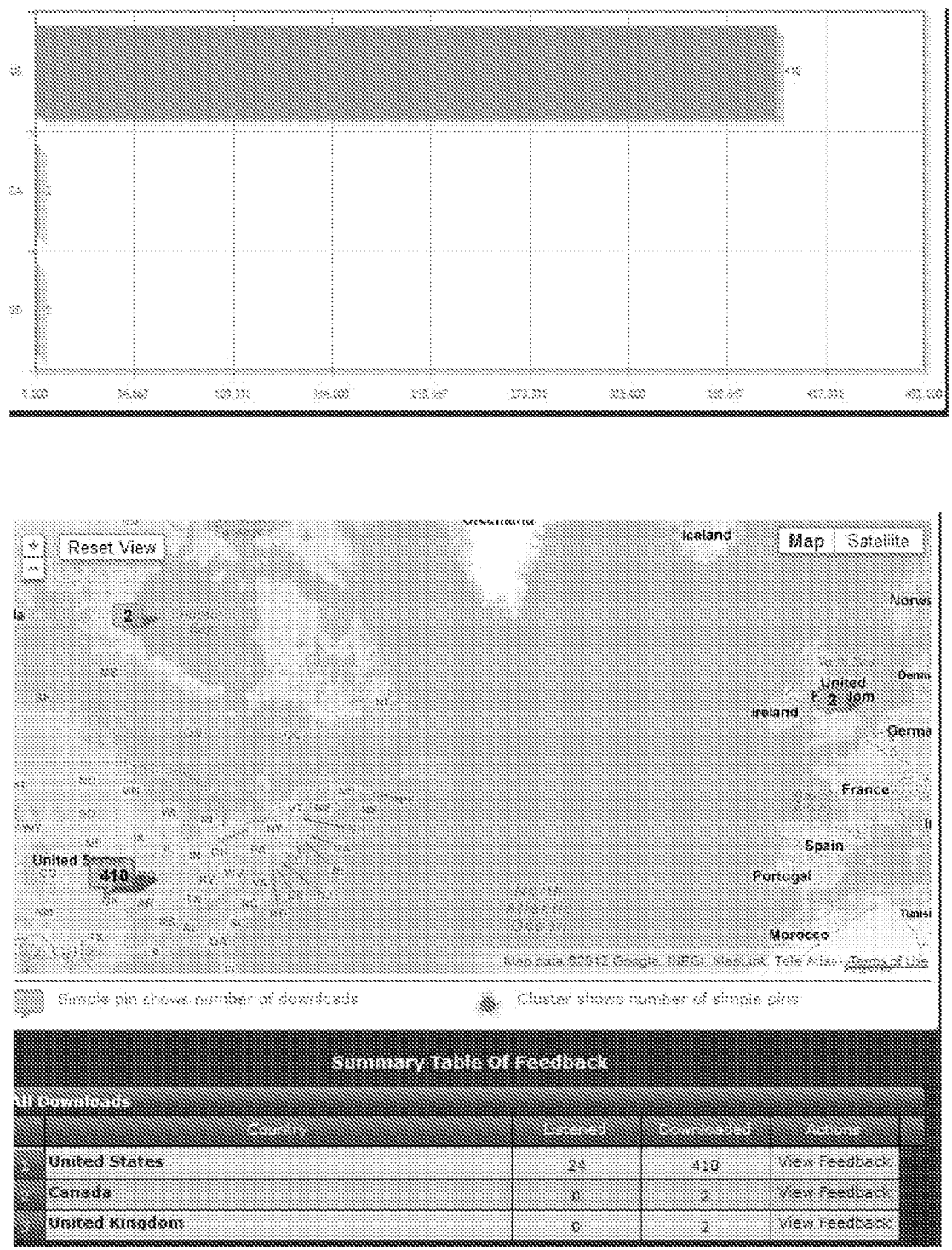

FIG. 16B allows a user to see a breakdown of download statistics from a plurality of DJs spread out globally. The user can see listen count and download count for each file. Note that markers on maps are selectable for more detailed information.

Figure 16C:
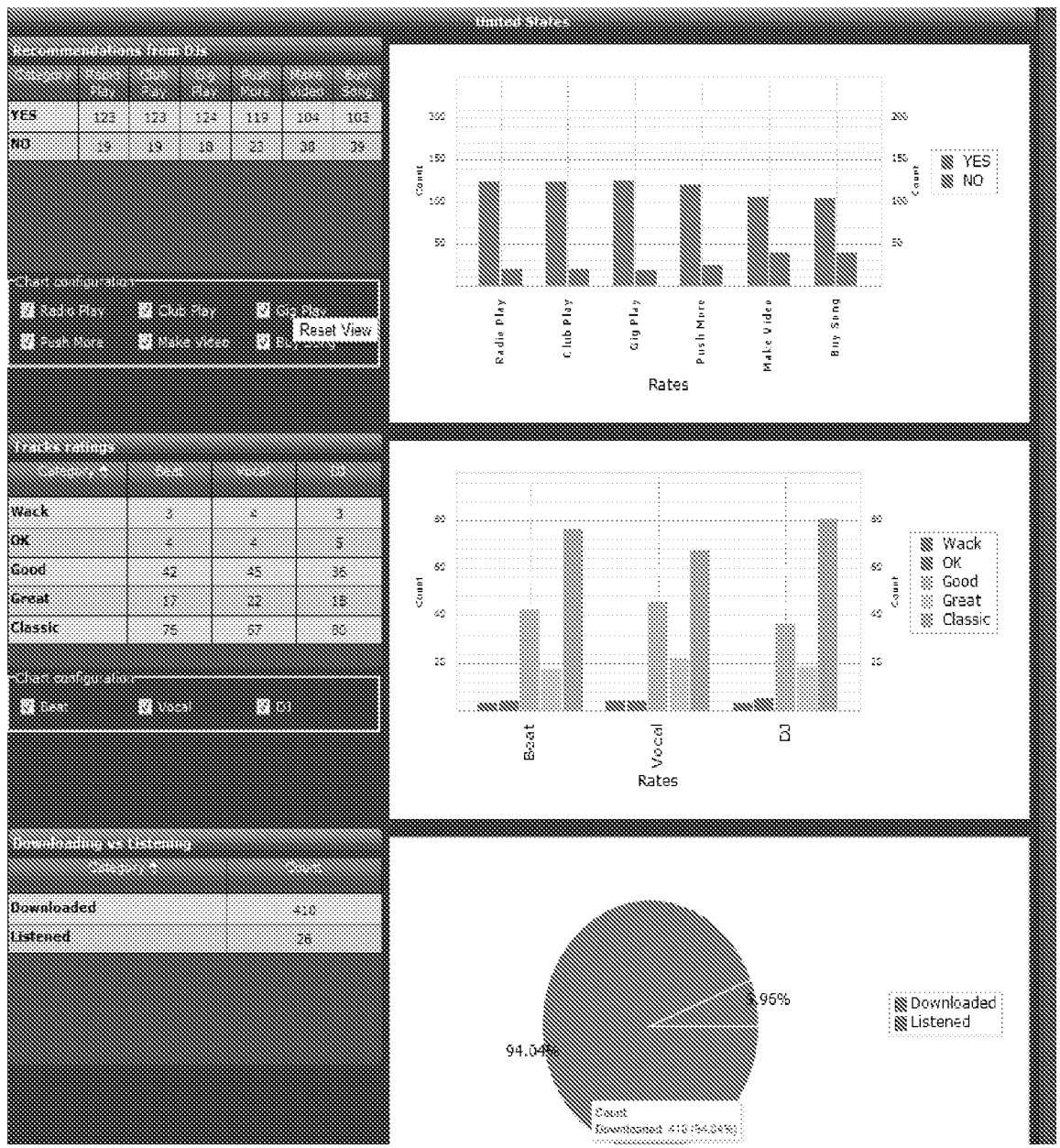

FIG. 16C allows a user to see a feedback for files from DJs spread out globally broken out into different categories, charts and tables.

Figure 16D:
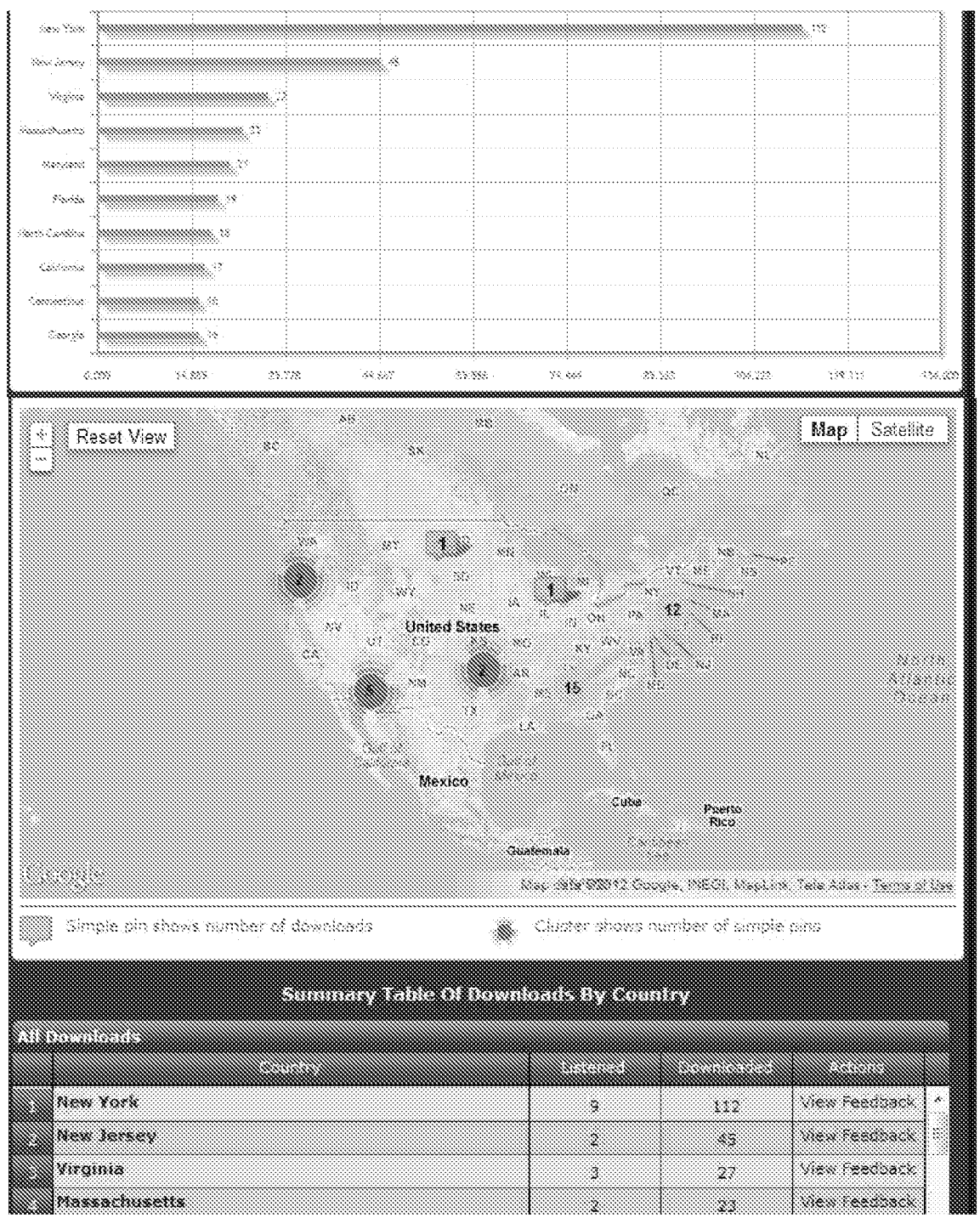

FIG. 16D allows a user to view download and listen count with in a country broken down by state.

Figure 16E:
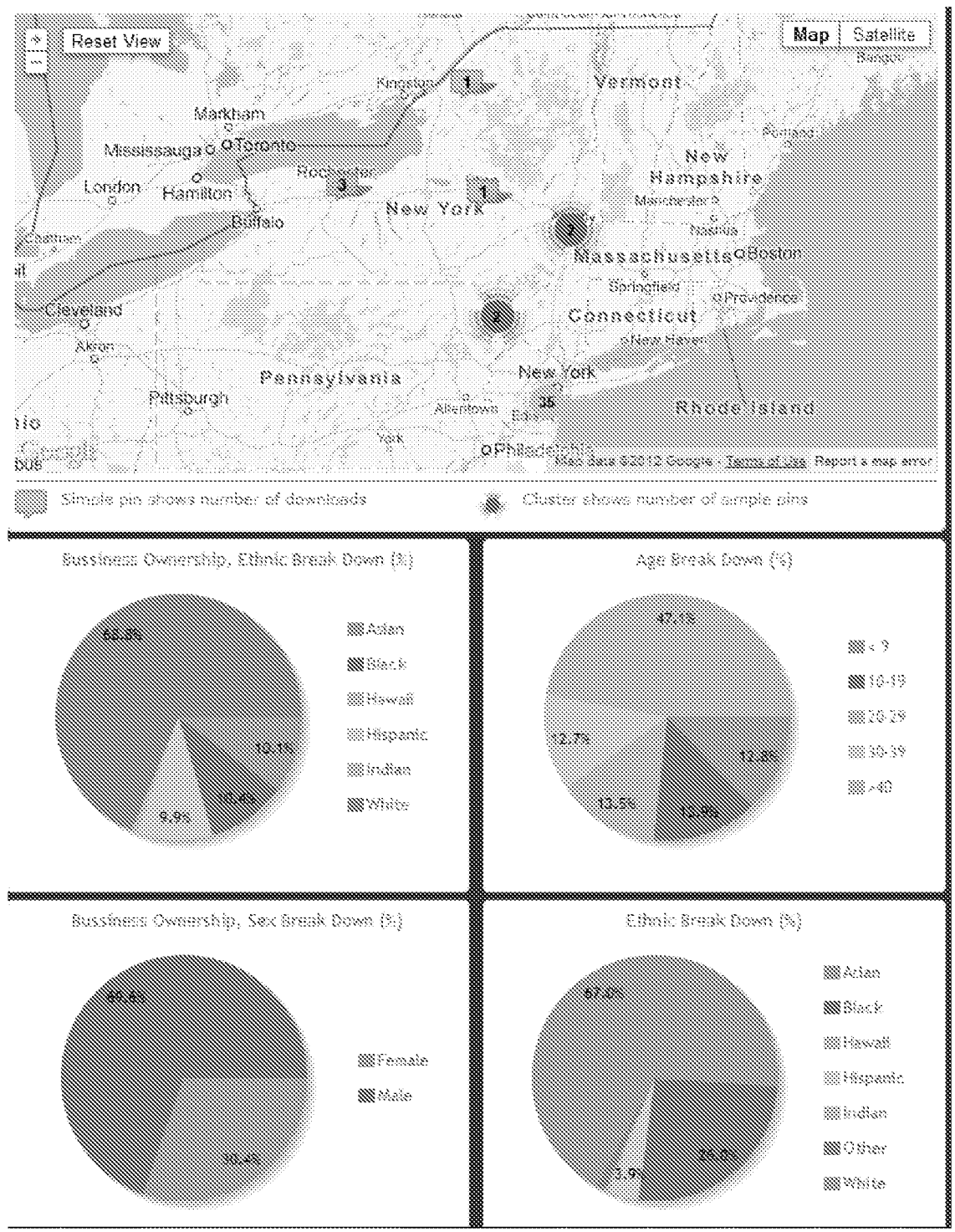

FIG. 16E allows a user to see a state only breakdown of download by a specific DJ. Such depiction also shows a demographic breakdown of a geographic area so an artist can improve marketing in that area. The demographic data is a sample of the data used and the possible usage to better predictive marketing and promotional planning for the artist.

Figure 16F:
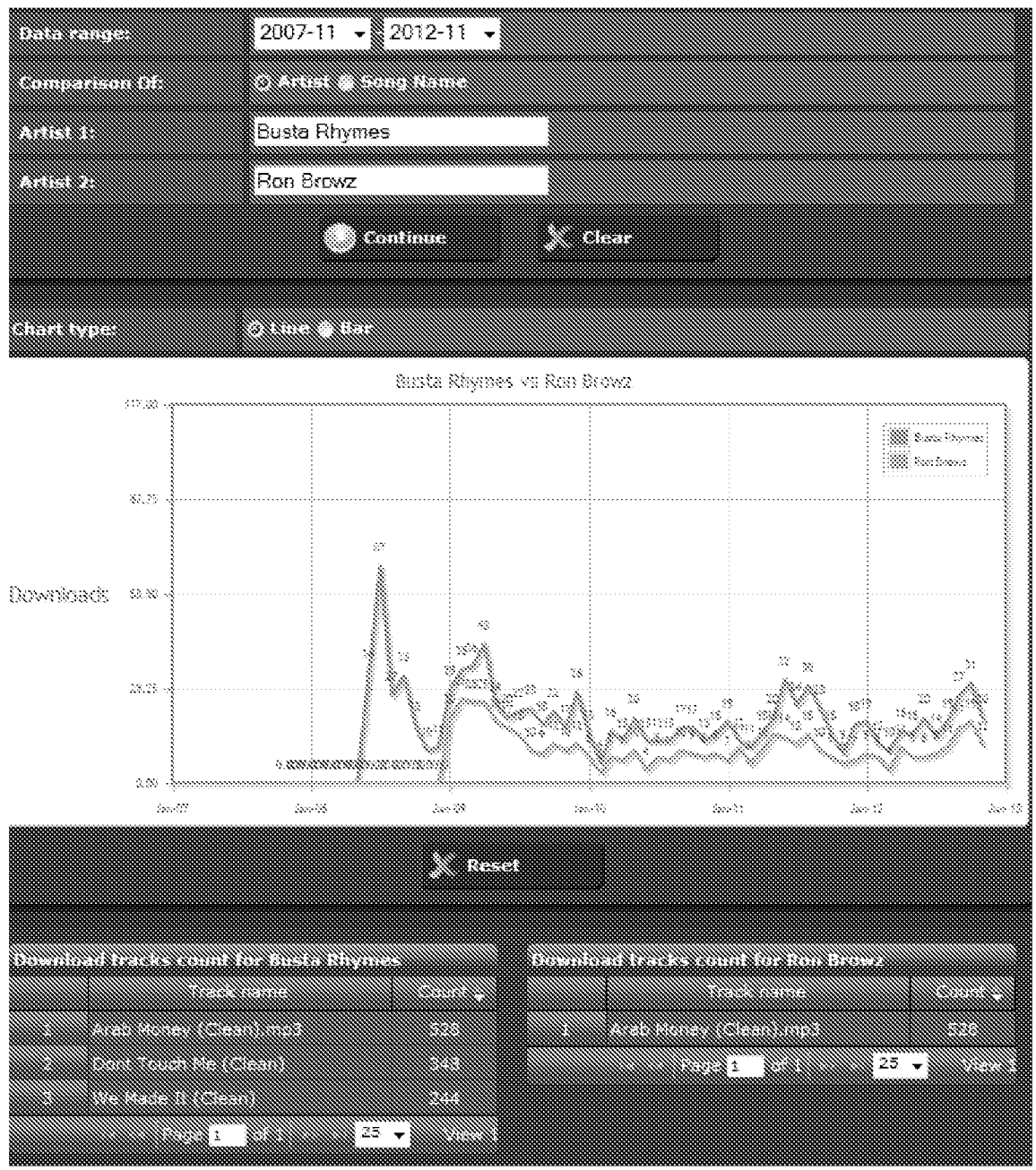

FIG. 16F allows a user to trend one artist against another artist for determining variations in performance over time based on download trending per file.

Figure 16G:
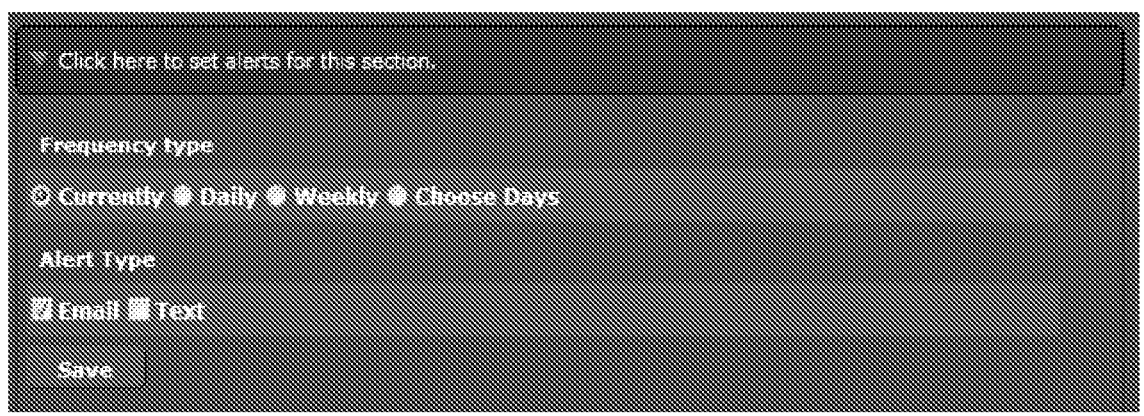

FIG. 16G allows a user to set alert options about when the file is played in real-time on a global basis. When the file is played, the user can receive alerts by text or email about the track being played.

Figure 16H:
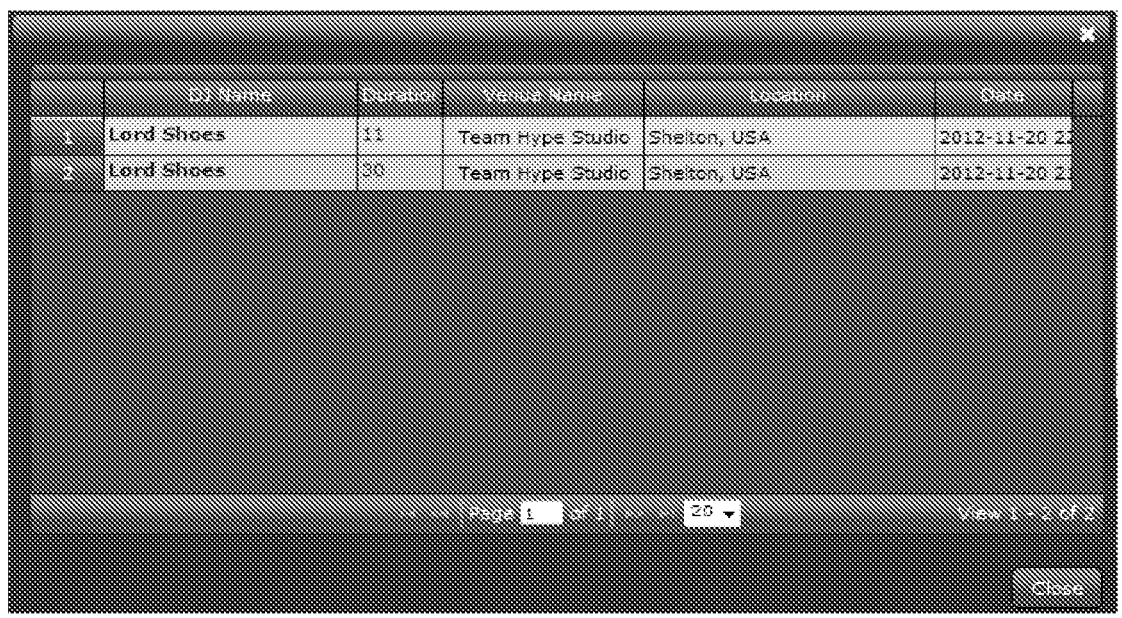

FIG. 16H allows a user to see info for a DJ who played a track at a global location.

Figure 16I:

FIG. 16I allows a user to see in real-time alerts when a file is played by a DJ and show where the file is played.

Figure 16J:
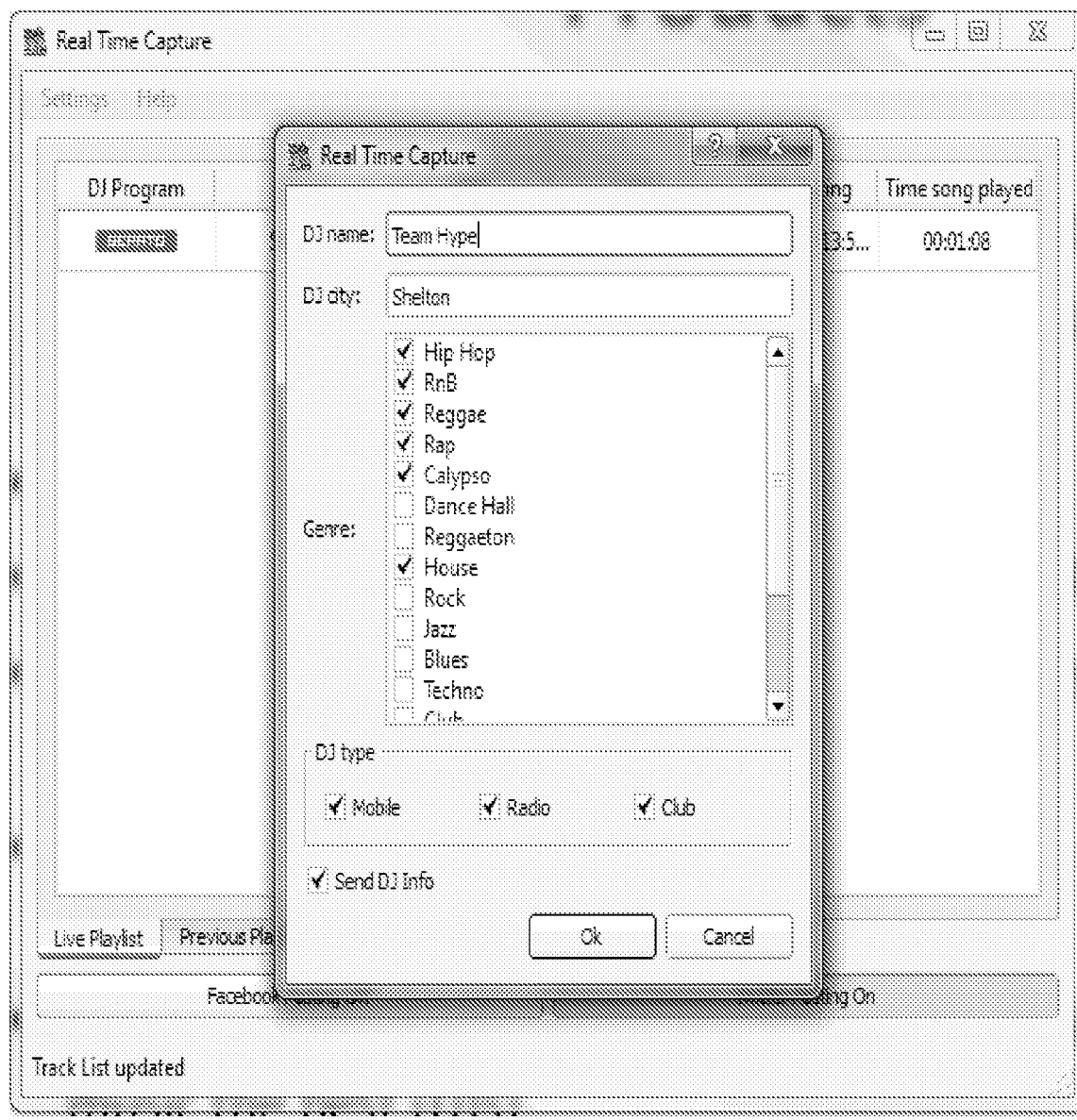

FIG. 16J depicts a real-time tool that runs on a DJ laptop or desktop. The tool detects a file played in DJ software, as described herein, and feed such detected information data to a database. From the database, the data is sent out in real-time to an artist and/or a record label.

Figure 16K:
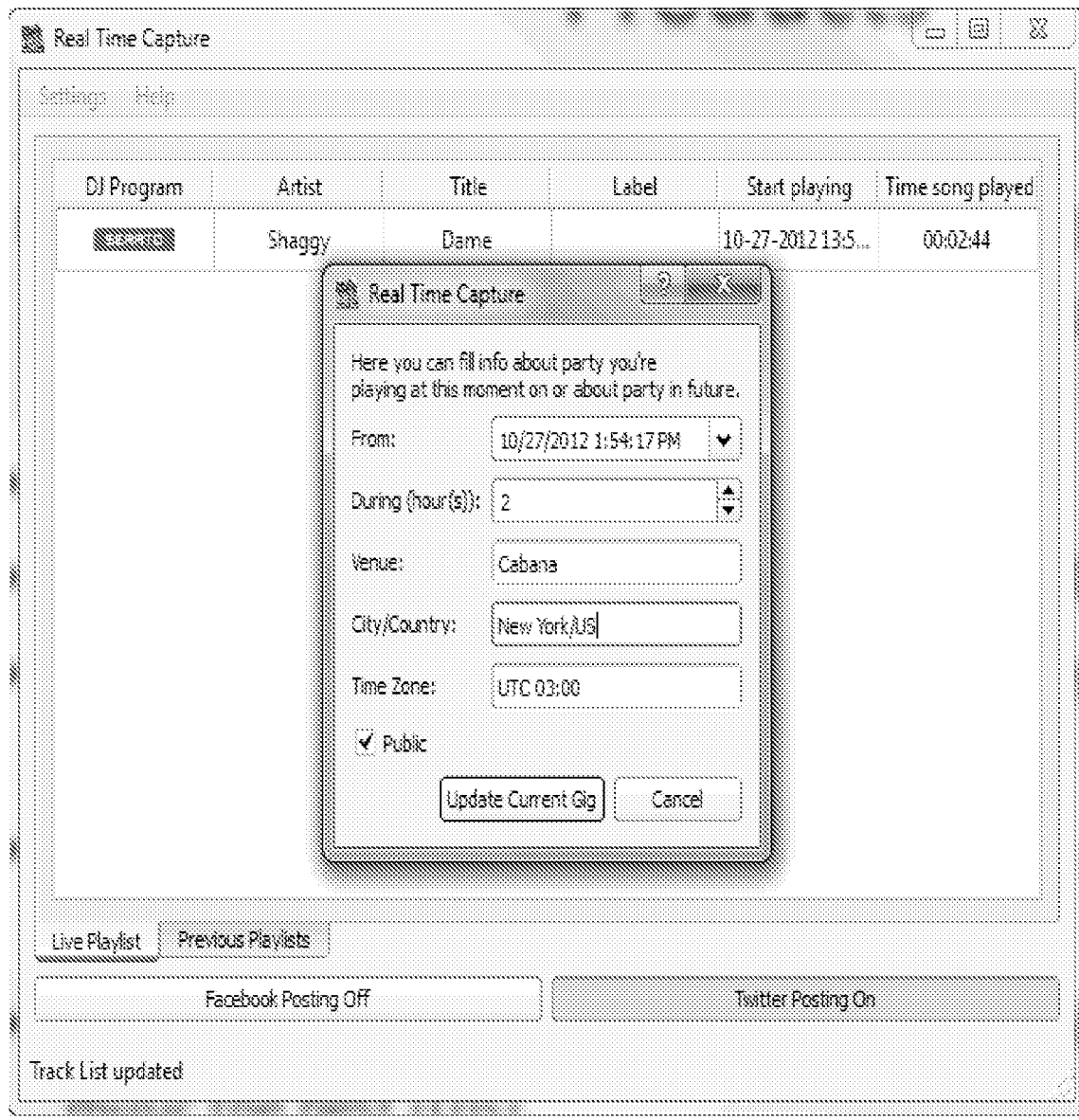

FIG. 16K depicts real-time song capture and user prompt for some feedback.

Figure 16L:
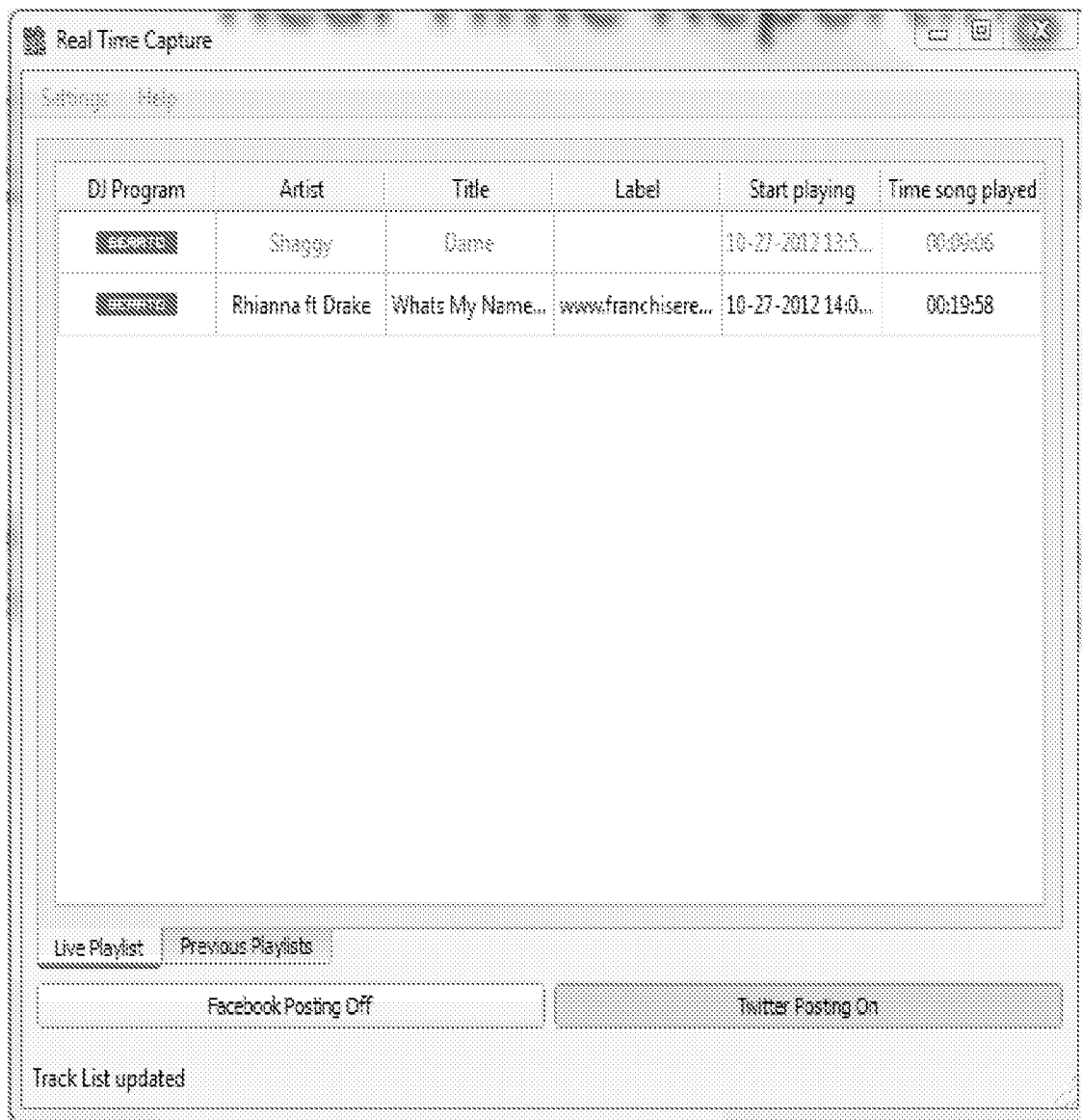

FIG. 16L depicts real-time song capture and other song use relevant information.

Figure 16M:
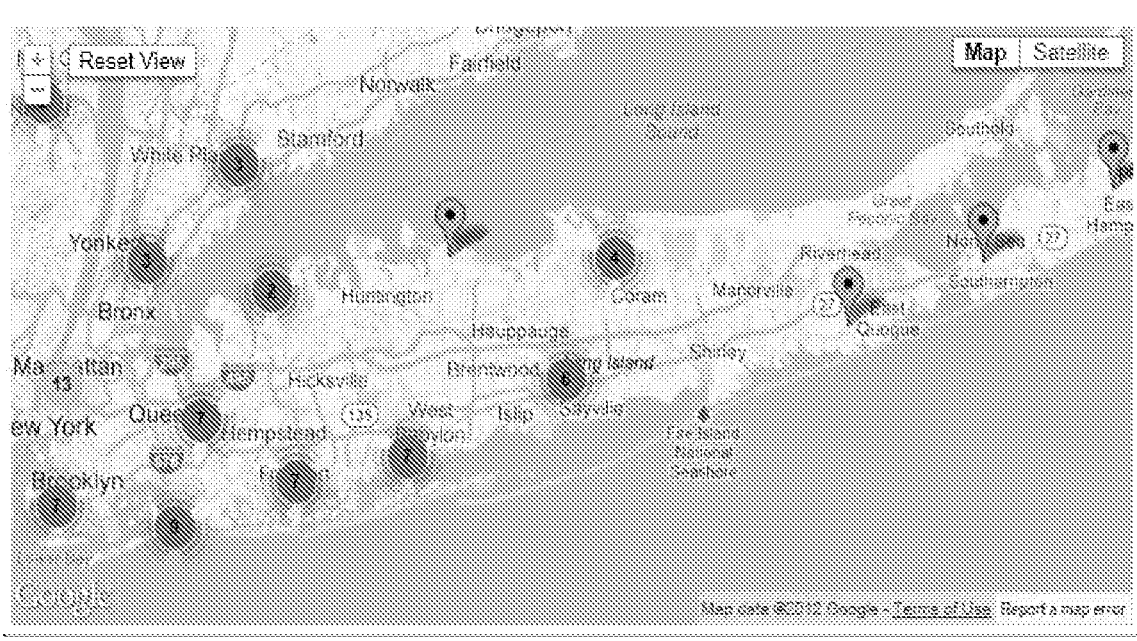

FIG. 16M allows a user to see where globally DJs are downloading a file.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as Java, Smalltalk, C#, C++ or the like, and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

While the preferred embodiment to the disclosure had been described, those skilled in the art, both now and in the future, may make various improvements and enhancements which fall within the scope of the claims which follow. These claims should be construed to maintain the proper protection for the disclosure first described.

The description of the present disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of this application.

What is claimed is:

1. A system comprising:
   a first client, a server, and a second client,
   wherein the first client runs a disc jockey (DJ) software application during an entertainment event such that the DJ software application (a) plays a song during the entertainment event, (b) identifies the song during the entertainment event while the song is being played by the DJ software application during the entertainment event, (c) generates a set of play data during the entertainment event while the song is being played by the DJ software application and containing an identifier of the song, an identifier of an artist performing the song, a time of play of the song by the DJ software application during the entertainment event, a location of play of the song by the DJ software application during the entertainment event, and an identifier of a first user operating the DJ software application during the entertainment event while the song is being played by the DJ software during the entertainment event, and
   (d) sends the set of play data to the server during the entertainment event, wherein the server detects the DJ software application before the song is identified during the entertainment event, and
   wherein the server receives the set of play data from the first client during the entertainment event and serves a webpage containing a dashboard based on the set of play data to the second client operated by a second user, wherein the dashboard presents a plurality of user interactive diagrams formed based on the identifier of the song, the identifier of the artist performing the song, the time of play of the song by the DJ software application during the entertainment event, the location of play of the song by the DJ software application during the entertainment event, or the identifier of the first user operating the DJ software application during the entertainment event while the song is being played by the DJ software during the entertainment event, wherein the second user is different from the first user, wherein the first user is geographically remote from the second user.

2. The system of claim 1, wherein the DJ software application has a background running module and the server detects the DJ software application based on the background running module.

3. The system of claim 1, wherein the DJ software application identifies the song based on monitoring of an audio output.

4. The system of claim 1, wherein the server serves the webpage to the second client during the entertainment event.

5. The system of claim 1, wherein the set of play data is sent periodically to the server during the entertainment event.

6. The system of claim 1, wherein the set of play data is sent in real-time to the server during the entertainment event.

7. The system of claim 1, wherein the server correlates the set of play data with a set of demographic data for the location of play of the song by the DJ software application during the entertainment event, wherein at least one of the user interactive diagrams presents the set of data integrated with the set of demographic data.

8. The system of claim 7, wherein the at least one of the interactive diagrams is a map view.

9. The system of claim 7, wherein the at least one of the interactive diagrams is a statistical chart.

10. The system of claim 1, wherein the server updates the dashboard in real-time based on the set of play data.

11. The system of claim 1, wherein the server determines whether there is a social network flag for the identifier of the song or the first user and causes a social media post to be made based on the identifier of the song or the first user responsive to the server determining that there is the social network flag for the identifier of the song or the first user.

12. The system of claim 11, wherein the social media post is simultaneously made to a plurality of social media networks.

* * * * *